United States Patent
Singh et al.

(10) Patent No.: US 9,994,761 B2
(45) Date of Patent: Jun. 12, 2018

(54) HYDROLYZABLE COMPOUNDS FOR TREATMENT OF A SUBTERRANEAN FORMATION AND METHODS OF USING THE SAME

(71) Applicant: Halliburton Energy Services, Inc., Houston, TX (US)

(72) Inventors: Dipti Singh, Kingwood, TX (US); Jeremy A. Holtsclaw, Kingwood, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days. days.

(21) Appl. No.: 14/897,542

(22) PCT Filed: Sep. 4, 2013

(86) PCT No.: PCT/US2013/058049
§ 371 (c)(1),
(2) Date: Dec. 10, 2015

(87) PCT Pub. No.: WO2015/034488
PCT Pub. Date: Mar. 12, 2015

(65) Prior Publication Data
US 2016/0122625 A1    May 5, 2016

(51) Int. Cl.
*C09K 8/60* (2006.01)
*C09K 8/035* (2006.01)
(Continued)

(52) U.S. Cl.
CPC .............. *C09K 8/60* (2013.01); *C04B 24/38* (2013.01); *C04B 28/02* (2013.01); *C09K 8/035* (2013.01);
(Continued)

(58) Field of Classification Search
CPC .......... C09K 8/60; C09K 8/035; C09K 8/467; C09K 8/706; C09K 8/725; C09K 8/72;
(Continued)

(56) References Cited

U.S. PATENT DOCUMENTS

| 3,480,084 A | 11/1969 | Eilers |
| 2006/0124302 A1* | 6/2006 | Gupta .................... C09K 8/516 166/279 |

(Continued)

FOREIGN PATENT DOCUMENTS

| EP | 2274013 A2 | 1/2011 |
| EP | 2374861 A1 | 10/2011 |
| WO | WO-2015034488 A1 | 3/2015 |

OTHER PUBLICATIONS

"International Application Serial No. PCT/US2013/058049, International Search Report dated Jul. 17, 2014", 3 pgs.
(Continued)

*Primary Examiner* — Silvana C Runyan
(74) *Attorney, Agent, or Firm* — Chamberlain Hrdlicka

(57) ABSTRACT

The present invention relates to hydrolyzable compounds for treatment of a subterranean formation and methods of using the same. In various embodiments, the present invention provides a method of treating a subterranean formation including obtaining or providing a composition comprising a hydrolyzable compound comprising at least one of an ester and an anhydride. The method can include placing the composition in a subterranean formation, and at least partially hydrolyzing the hydrolyzable compound to reduce the pH downhole. In various embodiments, the subterranean formation can include a crosslinked gel, and the method can include at least partially breaking the crosslinked gel to provide a broken gel. The method can include at least partially removing the broken gel from the subterranean formation.

19 Claims, 1 Drawing Sheet

(51) Int. Cl.
*C09K 8/70* (2006.01)
*C09K 8/72* (2006.01)
*C04B 24/38* (2006.01)
*C04B 28/02* (2006.01)
*C09K 8/467* (2006.01)
*C09K 8/92* (2006.01)
*E21B 43/16* (2006.01)
*E21B 43/26* (2006.01)
*C04B 103/00* (2006.01)

(52) U.S. Cl.
CPC .............. *C09K 8/467* (2013.01); *C09K 8/706* (2013.01); *C09K 8/72* (2013.01); *C09K 8/725* (2013.01); *C09K 8/92* (2013.01); *E21B 43/16* (2013.01); *E21B 43/26* (2013.01); *C04B 2103/0062* (2013.01); *C09K 2208/10* (2013.01); *C09K 2208/24* (2013.01); *C09K 2208/26* (2013.01)

(58) Field of Classification Search
CPC ............ C09K 2208/10; C09K 2208/24; C09K 2208/26; C04B 24/38; C04B 28/02; C04B 2103/0062; E21B 43/26
USPC .......................... 166/307, 305.1, 308.1, 90.1
See application file for complete search history.

(56) References Cited

U.S. PATENT DOCUMENTS

| | | | |
|---|---|---|---|
| 2007/0066492 A1* | 3/2007 | Funkhouser | C07D 493/10 507/261 |
| 2007/0277981 A1 | 12/2007 | Robb et al. | |
| 2009/0253599 A1 | 10/2009 | Luczak et al. | |
| 2010/0147515 A1* | 6/2010 | Hughes | C09K 8/685 166/271 |
| 2010/0252267 A1 | 10/2010 | Harris et al. | |
| 2010/0323929 A1 | 12/2010 | Reddy | |
| 2011/0053809 A1* | 3/2011 | Sanders | C09K 8/50 507/117 |

OTHER PUBLICATIONS

"International Application Serial No. PCT/US2013/058049, Written Opinion dated Jul. 17, 2014", 27 pgs.

"Australian Application Serial No. 2013399675, First Examiner Report dated Jul. 7, 2016", 4 pgs.

"International Application Serial No. PCT/US2013/058049, International Preliminary Report on Patentability dated Mar. 17. 2016", 29 pgs.

* cited by examiner

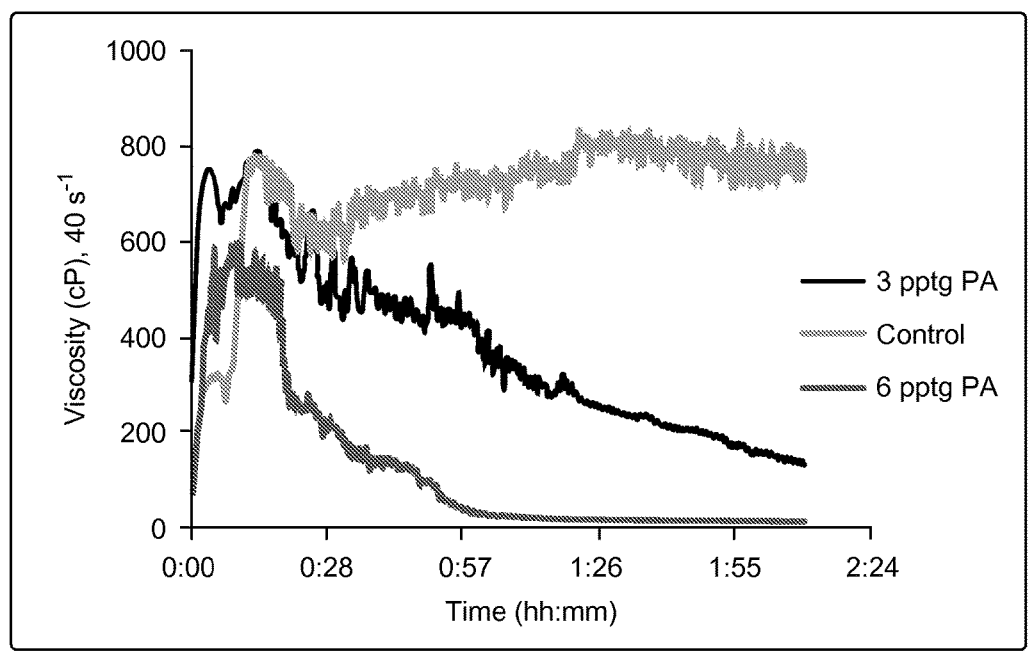

HYDROLYZABLE COMPOUNDS FOR TREATMENT OF A SUBTERRANEAN FORMATION AND METHODS OF USING THE SAME

PRIORITY APPLICATION

This application is a U.S. National Stage Filing under 35 U.S.C. 371 from International Application No. PCT/US2013/058049, filed Sep. 4, 2013; and published as WO 2015/03448 on Mar. 12, 2015; which application and publication are incorporated herein by reference in their entirety.

BACKGROUND OF THE INVENTION

Hydraulic fracturing is an important technique in the oilfield that includes placing or extending channels from the wellbore to the reservoir. This operation includes hydraulically injecting a fracturing fluid into a wellbore penetrating or adjacent to a petroleum-producing subterranean formation and forcing the fracturing fluid against the surrounding subterranean formation by pressure. The subterranean material is forced to crack, creating or enlarging one or more fractures. Proppant can be placed in fractures to prevent or reduce closure. The fractures can provide flow or can provide improved flow of the recoverable fluids from the formation, such as petroleum materials.

Viscous fluids are frequently used during downhole operations. For example, during a pad stage of fracturing, a fluid including viscosifier can be injected to begin to break into an area and initiate fractures to produce sufficient penetration and width to allow proppant-laden later stages to enter. In other examples, during various downhole operations solid materials are formed into a suspension with a viscous fluid and injected downhole. For example, during the slurry phase of hydraulic fracturing operations, a suspension of proppant is formed with fracturing fluid and injected downhole for deposition in fractures. Another example includes gravel pack operations, wherein a suspension of gravel is formed in a viscous fluid for transport downhole. After use of the viscous fluid downhole, a subsequent step usually involves removing from the fracture or other subterranean material to restore permeability and allow produced petroleum or downhole fluids to flow freely through the area. However, the high viscosity of the fluid can make removal difficult.

Viscous fluids for downhole operations are often formed using a gel or crosslinked gel, such as a crosslinked guar or guar derivatives. One technique for removing crosslinked guar includes the use of oxidative or enzymatic breakers. However, oxidative and enzymatic breakers suffer with poor efficiency and failure to provide adequate breakdown of the gel, which can, for example, cause gels to reheal (e.g., increase in viscosity and re-gel) as the temperature drops during extraction, or fail to enable efficient removal of the gel at lower temperatures.

SUMMARY OF THE INVENTION

In various embodiments, the present invention provides a method of treating a subterranean formation. The method includes obtaining or providing a composition including a hydrolyzable compound. The hydrolyzable compound includes at least one of an ester and an anhydride. The method includes placing the composition in a subterranean formation. The method includes at least partially hydrolyzing the hydrolyzable compound to reduce the pH downhole.

In various embodiments, the present invention provides a method of treating a subterranean formation. The method includes obtaining or providing a composition. The composition includes a hydrolyzable compound including at least one of an ester and an anhydride. The method includes placing the composition in a subterranean formation comprising a crosslinked gel. The method includes at least partially hydrolyzing the hydrolyzable compound to reduce the pH downhole. The method includes at least partially breaking the crosslinked gel to provide a broken gel. The method also includes at least partially removing the broken gel from the subterranean formation.

In various embodiments, the present invention provides a method of treating a subterranean formation. The method includes obtaining or providing a composition including a hydrolyzable compound. The compound includes at least one of an ester and an anhydride. The compound is selected from the group consisting of

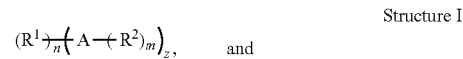

Structure I and

Structure II wherein
at each occurrence $R^1$ is independently selected from the group consisting of
a monovalent, divalent, or trivalent $R^4$ group, wherein at each occurrence $R^4$ is independently selected from $(C_1-C_{20})$hydrocarbyl, $(C_0-C_{20})$hydrocarbyl$(C_5-C_{20})$aryl$(C_0-C_{20})$hydrocarbyl, and $(C_0-C_{20})$hydrocarbyl$(C_5-C_{20})$heteroaryl$(C_0-C_{20})$hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N,
a polymer comprising a repeating unit having a structure selected from the group consisting of

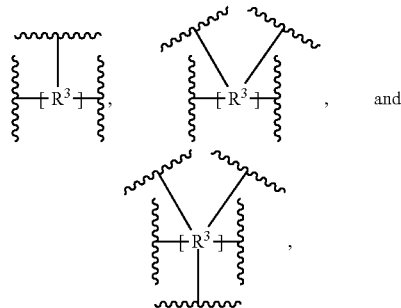

wherein $R^3$ is a trivalent, tetravalent, or pentavalent $R^4$ group,
$R^1$ together with one or two other $R^1$ groups bonded to the same A group or to a different A group is a divalent or trivalent $R^4$ group, and
$R^1$ together with an $R^2$ group bonded to the same A group or to a different A group is a divalent $R^4$ group; and
at each occurrence $R^2$ is independently selected from the group consisting of
—OH,
—$OR^1$, R² together with an R¹ group bonded to the same A group or to a different A group is a divalent R⁴ group, and R² together with an R¹ group bonded to a different A group is an —O— group;

at each occurrence z is independently 1, 2, or 3; and at each occurrence A is independently selected from the group consisting of

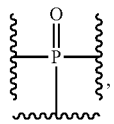

wherein n+m=3, n at each occurrence is independently 0, 1, or 2, and m at each occurrence is independently 1, 2, or 3,

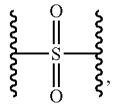

wherein n+m=2, n at each occurrence is independently 0 or 1, and m at each occurrence is independently 1 or 2, and

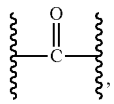

wherein n+m=2, n at each occurrence is independently 1 or 0, and m at each occurrence is independently 1 or 2. The method includes placing the composition in a subterranean formation. The method also includes at least partially hydrolyzing the hydrolyzable compound to reduce the pH downhole.

In various embodiments, the present invention provides a system. The system includes a composition including a hydrolyzable compound that includes at least one of an ester and an anhydride. The system also includes a subterranean formation including the composition therein.

In various embodiments, the present invention provides a composition for treatment of a subterranean formation. The composition includes a hydrolyzable compound. The hydrolyzable compound also includes at least one of an ester and an anhydride. In various embodiments, the composition further includes a downhole fluid. In various embodiments, the composition further includes a gel or a crosslinked gel.

In various embodiments, the present invention provides a method of preparing a composition for treatment of a subterranean formation. The method includes forming a composition including a hydrolyzable compound that includes at least one of an ester and an anhydride.

Various embodiments of the present invention provide certain advantages over other methods of treating subterranean formations, at least some of which are unexpected. In various embodiments, the hydrolyzable compound of the present invention can be more versatile and more effective in a greater number of scenarios and environments than other pH adjusters or breakers. In various examples, by varying the functional groups of the hydrolyzable compound, the solubility or rate of hydrolysis of the of the compound can be tuned, giving a high degree of control over the way the compound behaves in a wide variety of solvents and at various temperatures. In some embodiments, the method can provide a one-step pH adjustment or a one-step crosslinker-binder, wherein rather than being injected separately from the viscous fluid the hydrolyzable compound of the present invention can be included in the crosslinked gel during the downhole operation that requires the viscous fluid, and can be designed to acidify the gel or bind to the crosslinker in response to a passage of time or in response to various trigger events downhole, allowing for more controllable, convenient, and efficient pH adjustment or crosslinker binding than is available via other methods. Additionally, in some embodiments, the hydrolyzed compound can break down the gel or can assist other breakers in the surrounding environment of the gel to break down the gel.

In some embodiments, the method can provide a more controllable break of the gel, and can more effectively prevent rehealing or reviscosification of the gel system at lower temperatures, such as during recovery of the gel. In various embodiments, the method can provide more effective breakage at lower temperatures, which can be difficult or impossible with existing methods. In some embodiments the present invention provides a more efficient, robust, or versatile method of removing gels from a subterranean formation that can result in a more complete gel removal for a lower cost and in less time. In various embodiments, a faster and more complete gel removal can result in higher permeabilities achieved in less time, giving higher production rates more quickly or more effective and efficient subsequent treatments of the subterranean formation.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 1 illustrates the degradation profile of a guar gel crosslinked with boronic acid-derivatized polyacrylamide in the presence of various concentrations of phthalic anhydride, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750, 000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxyl groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxylamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R)$_2$, SR, SOR, SO$_2$R', SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH═CH($CH_3$), —CH═C($CH_3$)$_2$, —C($CH_3$)═$CH_2$, —C($CH_3$)═CH($CH_3$), —C($CH_2CH_3$)═$CH_2$, cyclohexenyl, cyclopentenyl, cyclohexadienyl, butadienyl, pentadienyl, and hexadienyl among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. Thus a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms sums up to equal the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure. A heteroaryl group designated as a $C_2$-heteroaryl can be a 5-ring with two carbon atoms and three heteroatoms, a 6-ring with two carbon atoms and four heteroatoms and so forth. Likewise a $C_4$-heteroaryl can be a 5-ring with one heteroatom, a 6-ring with two heteroatoms, and so forth. The number of carbon atoms plus the number of heteroatoms sums up to equal the total number of ring atoms. Heteroaryl groups include, but are not limited to, groups such as pyrrolyl, pyrazolyl, triazolyl, tetrazolyl, oxazolyl, isoxazolyl, thiazolyl, pyridinyl, thiophenyl, benzothiophenyl, benzofuranyl, indolyl, azaindolyl, indazolyl, benzimidazolyl, azabenzimidazolyl, benzoxazolyl, benzothiazolyl, benzothiadiazolyl, imidazopyridinyl, isoxazolopyridinyl, thianaphthalenyl, purinyl, xanthinyl, adeninyl, guaninyl, quinolinyl, isoquinolinyl, tetrahydroquinolinyl, quinoxalinyl, and quinazolinyl groups. Heteroaryl groups can be unsubstituted, or can be substituted with groups as is discussed herein. Representative substituted heteroaryl groups can be substituted one or more times with groups such as those listed herein.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, "degree of polymerization" is the number of repeating units in a polymer.

As used herein, the term "polymer" refers to a molecule having at least one repeating unit, and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid, or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "production fluid" refers to fluids or slurries used downhole during the production phase of a well. Production fluids can include downhole treatments designed to maintain or increase the production rate of a well, such as perforation treatments, clean-up treatments, or remedial treatments.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments downhole. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore; placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein "treatment of a subterranean formation" can include any activity directed to extraction of water or petroleum materials from a subterranean petroleum- or water-producing formation or region, for example, including drilling, stimulation, hydraulic fracturing, clean-up, acidization, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore, or vice-versa. A flow pathway can include at least one of a hydraulic fracture, a fluid connection across a screen, gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

Method of Treating a Subterranean Formation.

Various embodiments of the present invention provide a new chemical method to de-crosslink or break crosslinked gels in a subterranean formation, such as in a fracturing fluid including the crosslinked gel. Examples of suitable gels include any gel described herein, including borate-, boronate-, or boronic acid-crosslinked gels, polyacrylamides and polysaccharides such as guars crosslinked with boronates and borates, boronic acid-derivatized acrylamide gels, and modified acrylamide copolymer gels. Examples can include crosslinked gel systems including a polymer including acrylamide, such as about 90-99.9% m/m or about 99% m/m acrylamide; and a boronic acid monomer, such as about 0.1 to about 10% m/m or about 1% m/m boronic acid monomer. Examples can include crosslinked gel systems including a polymer including 2-acrylamido-2-methylpropane sulfonic acid (AMPS), such as about 40-80% m/m or about 60% m/m AMPS; acrylamide, such as about 20-60% m/m or about 39.5% m/m acrylamide; and acrylic acid, such as about 0.1-10% m/m or about 0.5% acrylic acid. Although numerous breakers such as oxidizers have been used to break crosslinked gels, there are often challenges with developing effective breakers for fracturing fluids. For example, if a breaker is not sufficiently efficient it can fail to provide or be difficult for the breaker to provide complete or adequate fluid break while also avoid rehealing of the gel as the temperature drops down, such as during recovery of the broken gel.

Various embodiments of the present invention provide a hydrolyzable compound that can lower the pH of the crosslinked gel, thereby helping to break the gel more efficiently and effectively. In various embodiments, the hydrolyzable compound, such as esters or anhydrides, can provide improved or additional cleanup of gels by causing or aiding the breaking of the gel. In some embodiments, the hydrolyzable compound or an acid or anion thereof formed by hydrolysis of the hydrolyzable compound can have chemical structure that has a greater binding affinity for various crosslinkers, various metals found in crosslinkers, or ions thereof, such as boron or ions thereof, than the crosslinked polymer itself, thus at least partially severing, sequestering, or isolating the crosslinker from the polymer, causing or aiding the breaking of the crosslinked polymer. In some embodiments, the hydrolyzable compound can be used in addition to other breakers such as oxidative or enzymatic breaker to provide an effective gel break and cleanup that has certain advantages over other methods as described herein.

In some embodiments, the present invention provides a method of treating a subterranean formation. The method can be a method is a method of breaking a crosslinked gel downhole. The method can be a method of at least partially removing a crosslinked gel from a subterranean formation. The method includes obtaining or providing a composition including a hydrolyzable compound. The obtaining or providing of the composition can occur at any suitable time and at any suitable location. The obtaining or providing of the composition can occur above the surface. The obtaining or providing of the composition can occur downhole. The method also includes placing the composition in a subterranean formation. The placing of the composition in the subterranean formation can include contacting the composition and any suitable part of the subterranean formation, or contacting the composition and a subterranean material downhole, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing, and can include any suitable contacting between the subterranean formation and the composition, wherein the hydrolyzable compound can in physical contact with or can be dissolved or suspended in a solution in fluid contact with the subterranean formation. The placing of the composition in the subterranean formation can include at least partially depositing the composition in a fracture, flow pathway, or area surrounding the same. In some embodiments, the subterranean formation, such as the fracture, flow pathway, or area surrounding the same, can include at least one of a crosslinked gel and a proppant.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another, for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of pre-pad stage (e.g., during injection of water with no proppant, and additionally or optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter) or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidization, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

The method can include at least partially hydrolyzing the hydrolyzable compound to reduce the pH downhole. In some embodiments, the change in pH can provide or can contribute providing a broken gel or a gel having reduced viscosity. The reduction of pH downhole can occur in any suitable location in the subterranean formation downhole, such as at, adjacent to, or fluidly connected to the location downhole where the hydrolyzable compound is hydrolyzed. In embodiments that include a crosslinked gel in the composition, or that include the composition being placed in a subterranean formation including a crosslinked gel, the change in pH can occur adjacent to the gel (e.g. in the fluid near-to, surrounding, or contacting the gel) or in the gel (e.g. in fluid at least partially within or surrounded by the gel). The change in pH can occur at any suitable time with respect to the placement of the composition in the subterranean formation. For example, the change in pH can occur at least one of during and after placement of the composition in the subterranean formation, or at least one of during and after the placement or deposition of the composition in a fracture, flow pathway, or area surrounding the same. The change in pH can occur over any suitable duration, such as over the duration that the majority of the hydrolysis occurs, such as over a period of about 1 second to 7 days, or a period of about 1 minute to about 2 days, or about 1 second or less, 5 s, 10 s, 30 s, 1 minute, 2 min, 3 min, 4 min, 5 min, 10 min, 15 min, 30 min, 45 min, 1 hour, 1.5 h, 2 h, 3 h, 4 h, 5 h, 10 h, 15 h, 20 h, 1 day, 1.5 d, 2 d, 3 d, 4 d, 5 d, 6 d, or about 7 days or more. The change in pH can be any suitable change in pH. For example, the change in pH can be a reduction in pH of about 0.01 to about 20 or about 0.1 to about 5, or about 0.01 or less, or about 0.05, 0.1, 0.25, 0.5, 0.75, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, or about 20 or more. The change in pH can include a pH of the crosslinked gel (e.g., adjacent to the gel (e.g. in the fluid near-to, surrounding, or contacting the gel) or in the gel (e.g. in fluid at least partially within or surrounded by the gel)) before the pH change of greater than or equal to about 8 to about 20, or 8 to about 13, or about 7 or less, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or about 20 or more, and a pH of the crosslinked gel after the pH change (or of the broken gel, or of a mixture of the crosslinked gel and the broken gel) of about 1 to less than 8, or about 2 to less than 8, or about 1 or less, or 2.5, 3, 3.5, 4, 4.5, 5, 5.5, 6, 6.5, 7, 7.5, 8, 8.5, or about 9 or more.

The hydrolysis of the hydrolyzable compound can be any suitable hydrolysis that generates an acid. The method can include triggering the hydrolysis of the hydrolyzable compound. The triggering can be any suitable triggering that gives rise to at least partial hydrolysis of the hydrolyzable compound. For example, the triggering can include exposing at least some of the composition to at least one of a chemical activator, heat, pH change, time, and vibration. In some examples, a chemical activator can be an acid, base, or other catalyst. In some embodiments, a material such as water or petroleum can interact with another compound in the composition to trigger a reaction between the hydrolyzable compound and the other compound that results in hydrolysis of the hydrolyzable compound. A heat trigger can be a downhole temperature in the area of the subterranean formation where the composition is placed, and can be heat generated by fracturing. The trigger for hydrolysis can be a change in pH, such as the pH of a solution surrounding a gel (e.g., a pH greater than about 8-8.5) when the composition including the hydrolyzable compound is added to a crosslinked gel in the subterranean formation. The trigger can be passage of a sufficient amount of time in a particular chemical environment, such as to allow dissolution of the hydrolyzable compound. A time trigger can include the slow production of the acid produced upon hydrolysis over time, or a delay before any substantial hydrolysis occurs. The trigger can be a vibration that helps the hydrolyzable compound to go into solution to enable hydrolysis thereof. In some embodiments, the composition including the hydrolyzable compound includes a protective shell encapsulating the hydrolyzable compound. The protective shell can have any suitable thickness, such as about 1 nm or less, or about 2 nm, 3 nm, 4 nm, 5 nm, 10 nm, 20 nm, 50 nm, 100 nm, 250 nm, 500 nm, 750 nm, 0.001 mm, 0.005 nm, 0.01 mm, 0.05 mm, 0.1 mm, 0.5 mm, 1 mm, 2 mm, 3 mm, 4 mm, or about 5 mm or more. The protective shell can at least partially protect the hydrolyzable compound from the surrounding environment, such as the surrounding chemical environment. In some embodiments, the protective shell can be at least one of soluble, porous, and can have pore formers therein. Triggering the hydrolysis can include breaking or chemically dissolving at least part of the protective shell to release the hydrolyzable compound, such as by exposure to heat, water, petroleum, vibration, friction, or the like. The encapsulated hydrolyzable compound can be a nanoparticle. The encapsulated hydrolyzable compound can have any suitable particle size, such as about 0.1 nm to about 10 mm, or about 1 nm to about 5 mm. The encapsulant can be any suitable material, such as a polysaccharide, an oil such as vegetable oil or a petroleum oil, latex, gelatin, a carageenan, a homopolymer or copolymer of a substituted or unsubstituted ($C_1$-$C_{10}$)alkene, such as ethylene, propylene, isobutylene, vinyl chloride, and vinylidene chloride, tristearin, polyethylene, polypropylene, polyisobutylene, a copolymer of vinyl chloride and vinylidene chloride, a copolymer of vinylidene chloride and a ($C_1$-$C_5$) alkyl ester of an unsaturated ($C_3$-$C_{20}$)carboxylic acid or a copolymer of ethylene and an unsaturated ($C_3$-$C_{20}$) carboxylic acid.

The composition can include any suitable materials in addition to the hydrolyzable compound. In various embodiments, the composition includes at least one of water, brine, an aqueous liquid, a non-aqueous liquid, an oil, an organic solvent, a breaker, a downhole fluid, an alcohol, a gel, a crosslinked gel, a crosslinker, a base, and an acid.

In various embodiments, the method includes at least partially breaking the crosslinked gel, to provide a broken gel. The method can also include at least partially removing the broken gel from the subterranean formation.

Breaking of Crosslinked Gel.

In various embodiments, the composition including the hydrolyzable compound includes one or more gels or crosslinked gels. In some embodiments, the subterranean formation where the composition including the hydrolyzable compound is placed includes a gel or crosslinked gel. After being placed in the subterranean formation, the hydrolyzable compound can be in fluid contact with the gel or crosslinked gel. The composition including the hydrolyzable compound can include a crosslinker for crosslinking gel, or the subterranean formation can include a crosslinker for crosslinking gel. The gel or crosslinked gel can include a one or more crosslinkers. The gel can be crosslinked in the composition including the hydrolyzable compound before, during, or after placement in the subterranean formation. A gel in the subterranean formation can be crosslinked before, during, or after placement of the composition including the hydrolyzable compound in the subterranean formation.

The method can include breaking the crosslinked gel, to provide a broken gel. The breaking of the gel can occur at least one of before, during, and after the hydrolysis of the hydrolyzable compound. The broken gel can be any suitable broken gel; for example, the broken gel can be similar to the crosslinked gel but have less crosslinks or other connecting bonds and a corresponding lower viscosity as compared to the crosslinked gel. Breaking the crosslinked gel can occur via any suitable mechanism. The breaking can be due to the effect of the lowering of the pH caused at least in part by the hydrolysis of the hydrolyzable compound, the breaking can be due to the action of other materials such as breakers present in the composition or adjacent to crosslinked gel downhole, or a combination thereof. For example, breaking the crosslinked gel can include at least one of breaking the intramolecular crosslinks between the molecules that are in the crosslinked gel, and breaking the intramolecular bonds in the molecules that are in the crosslinked gel. The breaking can occur via any suitable mechanism or combination of mechanisms. For example, breakers in the composition or in another subterranean location can break the gel, such as via oxidation or enzymatic action that breaks intermolecular crosslinks between the gel molecules or that breaks intramolecular crosslinks in the gel molecules. In some examples, chemical action of the acid generated by the hydrolysis of the hydrolyzable compound breaks the crosslinked gel, such as via oxidation, enzymatic action, by making an un-crosslinked state more thermodynamically stable as compared to a crosslinked state. In some embodiments, the hydrolyzable compound, the acid or an anion thereof generated by the hydrolysis of the hydrolyzable compound, or another material present in the composition (e.g. a carboxylic acid or acid ester) causes or assists breaking of the crosslinked gel via binding, chelation, or other coordination between a metal or metal ion in the crosslinker (e.g., chromium, aluminum, antimony, zirconium, titanium, calcium, boron, iron, silicon, copper, zinc, magnesium, and an ion thereof) and the acid, ester, or anhydride.

The crosslinked gel can have any suitable viscosity. For example, the crosslinked gel can have a viscosity (under downhole conditions or at standard temperature and pressure) of about 100 cP to about 1,000,000,000 cP, or about 50 cP or less, or about 75 cP, 100, 150, 200, 300, 400, 500, 750, 1000, 1250, 1,500, 2,000, 3,000, 4,000, 5,000 cP, 10,000, 15,000, 20,000, 25,000, 50,000, 100,000, 250,000, 500,000, 1,000,000, 5,000,000, 50,000,000, 100,000,000, 500,000,000 or about 1,000,000,000 cP or more (e.g., the crosslinked gel can have substantially infinite viscosity). The reduction of viscosity in the broken gel as compared to the crosslinked gel can be any suitable reduction in viscosity. For example, the reduction can be a reduction in viscosity of the crosslinked gel of about 0.01 cP or less, or about 0.05 cP, 0.1, 0.5, 1, 2, 3, 4, 5, 10, 15, 20, 25, 50, 75, 100, 150, 200, 300, 400, 500, 750, 1000, 1250, 1,500, 2,000, 3,000, 4,000, 5,000 cP, 10,000, 15,000, 20,000, 25,000, 50,000, 100,000, 250,000, 500,000, 1,000,000, 5,000,000, 50,000,000, 100,000,000, 500,000,000 or about 1,000,000,000 cP or more. The broken gel can have any suitable viscosity. For example, the broken gel can have a viscosity of about 0.01 cP to about 1,500 cP under downhole conditions, or about 0.05 cP to about 100 cP under downhole conditions, or about 0.01 cP or less, or about 0.05 cP, 0.1, 0.5, 1, 2, 3, 4, 5, 10, 15, 20, 25, 50, 75, 100, 150, 200, 250, 300, 400, 500, 600, 700, 800, 900, 1,000, 1,100, 1,200, 1,300, 1,400, 1,500, 2,000, 5,000, 10,000, 15,000, 20,000, 25,000, or about 50,000 cP or more.

In some embodiments, after the breaking or the lowering in viscosity of the gel, the method can include at least partially removing the gel from the subterranean formation. The removing can occur in any suitable fashion. For example, the removing can include flushing the subterranean formation with water or an aqueous solution injected downhole, injection of an oxidative breaker, injection of an enzymatic breaker, or a combination thereof. The removing of the gel can include diluting and flushing the gel away from the subterranean formation using an aqueous solution injected downhole. During the removing of the broken gel, the gel can remain substantially broken during transit to the surface, for example, such that no more than 0.01% or less of the original viscosity of the crosslinked gel is restored, or about 0.05%, 0.1%, 0.5%, 1% 2%, 3%, 4%, 5%, 10%, 15%, 20%, 25%, 30%, 35%, 40%, or about 45%, or no more than about 50% of the original viscosity of the crosslinked gel is restored. In another example, during the removing of the broken gel, the gel can remain substantially broken during transit to the surface such that no more than a 0.01% increase in viscosity occurs during the transit, or about 0.05%, 0.1%, 0.5%, 1% 2%, 3%, 4%, 5%, 10%, 20%, 30%, 40%, 50%, 60%, 70%, 80%, 90%, 100%, 110%, 120%, 150%, 200%, 250%, 300%, 400%, 500%, 600%, 700%, 800%, 900%, or no more than about a 1000% increase in viscosity occurs during the transit to the surface.

The area downhole where the composition is placed in the subterranean formation can have any suitable temperature. For example, the temperature can be about 20° F. to about 300° F., or about 50° F. to about 150° F., or about 20° F. or less, or about 30° F., 40, 50, 75, 100, 125, 150, 175, 200, 225, 250, 275, or about 300° F. or more. During recovery and transport to the surface, the broken gel can be brought to any suitable temperature, such as cooling to about 20° F. to about 150° F., or about 30° F. to about 50° F., or about 20° F. or less, or about 25, 30, 35, 40, 45, 50, 55, 60, 65, 70, 75, 80, 85, 90, 95, 100, 105, 110, 115, 120, 125, 130, 135, 140, 145, or about 150° F. or more.

Gel or Crosslinked Gel.

In embodiments that include a gel or crosslinked gel in the composition, the gel or crosslinked gel can be present in any suitable amount, such that the composition can be used as described herein. For example, the one or more gels or crosslinked gels can together be about 0.000,000.1 wt % to about 90 wt % of the composition, or about 0.001 wt % to about 50 wt % of the composition, or about 0.000,000.1 wt % of the composition or less, or about 0.000,001 wt % of the composition, or about 0.000,01 wt %, 0.000,1, 0.001, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, 99.999,9, 99.999,99, 99.999,999, or about 99.999,999.9 wt % or more of the composition. For example, the one or more crosslinkers can together be about 0.000,000.1 wt % to about 30 wt % of the composition, or about 0.001 wt % to about 10 wt % of the composition, or about 0.000,000.1 wt % of the composition or less, or about 0.000,001 wt % of the composition, or about 0.000,01 wt %, 0.000,1, 0.001, 0.01, 0.1, 1, 2, 3, 4, 5, 10, 15, 20, 25, 30, 35, 40, 45 wt %, or about 50 wt % or more of the composition The gel or crosslinked gel can be any suitable gel or crosslinked gel. include a linear polysaccharide or a poly(($C_2$-$C_{10}$)alkenylene), wherein the ($C_2$-$C_{10}$)alkenylene can be substituted or unsubstituted. The gel or crosslinked gel can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, and derivatized cellulose. The gel or crosslinked gel can include at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

The crosslinker can be any suitable crosslinker. The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$)hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

Hydrolyzable Compound.

The composition can include one or more hydrolyzable compounds. The hydrolyzable compound can be present in the composition that is placed in the subterranean formation in any suitable amount, such that the composition can be used as described herein. For example, the one or more hydrolyzable compounds can together be about 0.000,000.1 wt % to about 100 wt % of the composition, or about 0.001 wt % to about 20 wt % of the composition, or about 0.000,000.1 wt % of the composition or less, or about 0.000,001 wt % of the composition, or about 0.000.01 wt %, 0.000,1, 0.001, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, 99.999,9, 99.999,99, 99.999,999, or about 99.999,999.9 wt % or more of the composition. The hydrolyzable compound can be any suitable compound that can react with at least one of water, and an —OH bearing compound such as an alcohol or a glycol, wherein the reaction can also include participation of any other suitable additional compounds such as a catalyst (e.g., acid, base, or another catalyst), to provide an acid. The acid provided can include, for example, a carboxylic acid, a sulfonic acid, a phosphonic acid, sulfuric acid, and phosphoric acid.

The hydrolyzable compound can include at least one of an ester and an anhydride. In some embodiments, the hydrolyzable compound includes at least one of a carboxylate, a sulfonate, a sulfate, a phosphate, and a phosphonate moiety. The hydrolyzable compound can be a polymer including at least one of a carboxylate, a sulfonate, a sulfate, a phosphate, phosphonate moiety. In various embodiments, the chemical structure of the hydrolyzable compound can cause it to have a solubility or hydrolysis rate under the conditions after the composition is placed downhole such that the compound hydrolyzes at a desired time or over a desired time. For example, for an aqueous environment in the subterranean formation the compound can have nonpolar groups such as alkyl chains or aromatic rings that slow at least one of the solubility or rate of hydrolysis of the compound, or polar groups such as hydroxyl or amine groups that can increase the solubility or rate of hydrolysis of the compound.

In some embodiments, the hydrolyzable compound is chosen from

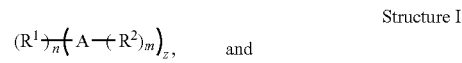

Structure I and

Structure II

At each occurrence $R^1$ is independently chosen from a monovalent, divalent, or trivalent $R^4$ group, wherein at each occurrence $R^4$ is independently selected from ($C_1$-$C_{20}$)hydrocarbyl, ($C_0$-$C_{20}$)hydrocarbyl($C_5$-$C_{20}$)aryl($C_0$-$C_{20}$)hydrocarbyl, and ($C_0$-$C_{20}$)hydrocarbyl($C_5$-$C_{20}$)heteroaryl($C_0$-$C_{20}$)hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N, a polymer comprising a repeating unit having a structure selected from the group consisting of

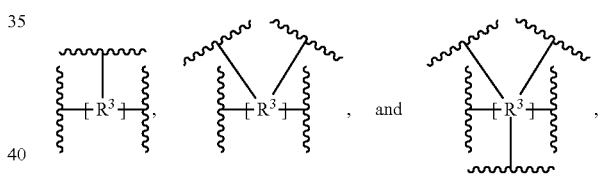

wherein $R^3$ is a trivalent, tetravalent, or pentavalent $R^4$ group, $R^1$ together with one or two other $R^1$ groups bonded to the same A group or to a different A group is a divalent or trivalent $R^4$ group, and $R^1$ together with an $R^2$ group bonded to the same A group or to a different A group is a divalent $R^4$ group.

At each occurrence $R^2$ is independently chosen from —OH, —O$R^1$, $R^2$ together with an $R^1$ group bonded to the same A group or to a different A group is a divalent $R^4$ group, and $R^2$ together with an $R^1$ group bonded to a different A group is an —O— group. At each occurrence z is independently 1, 2, or 3. Also, at each occurrence A is independently chosen from

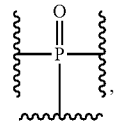

wherein n+m=3, n at each occurrence is independently 0, 1, or 2, and m at each occurrence is independently 1, 2, or 3,

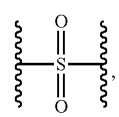

wherein n+m=2, n at each occurrence is independently 0 or 1, and m at each occurrence is independently 1 or 2, and

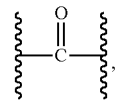

wherein n+m=2, n at each occurrence is independently 1 or 0, and m at each occurrence is independently 1 or 2.

In some embodiments, at each occurrence $R^1$ can be a group independently chosen from $(C_1-C_{20})$alkyl, $(C_0-C_{20})$alkyl$(C_5-C_{20})$aryl$(C_0-C_{20})$alkyl, and $(C_0-C_{20})$alkyl$(C_5-C_{20})$heteroaryl$(C_0-C_{20})$alkyl, wherein each alkyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N. At each occurrence $R^1$ can be a group independently selected from the group consisting of $(C_1-C_{10})$alkyl and $(C_0-C_{10})$alkyl$(C_5-C_{10})$aryl$(C_0-C_{10})$alkyl. At each occurrence $R^1$ can be independently $(C_2-C_5)$alkyl. At each occurrence $R^1$ can be independently selected from the group consisting of phenyl, methyl, ethyl, propyl, and butyl.

In some embodiments, at each occurrence $R^4$ can be a group independently chosen from $(C_2-C_{20})$alkyl, $(C_0-C_{20})$alkyl$(C_5-C_{20})$aryl$(C_0-C_{20})$alkyl, and $(C_0-C_{20})$alkyl$(C_5-C_{20})$heteroaryl$(C_0-C_{20})$alkyl, wherein each alkyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N. At each occurrence $R^4$ can be a group independently chosen from $(C_2-C_{10})$alkyl, and $(C_0-C_{10})$alkyl$(C_5-C_{10})$aryl$(C_0-C_{10})$alkyl. At each occurrence $R^4$ can be independently $(C_2-C_5)$alkyl. At each occurrence $R^4$ is independently substituted or unsubstituted ethyl, or substituted or unsubstituted phenyl. In some embodiments, A can be carbonyl (—C(O)—), n is 1, and m is 1.

The hydrolyzable compound can be chosen from

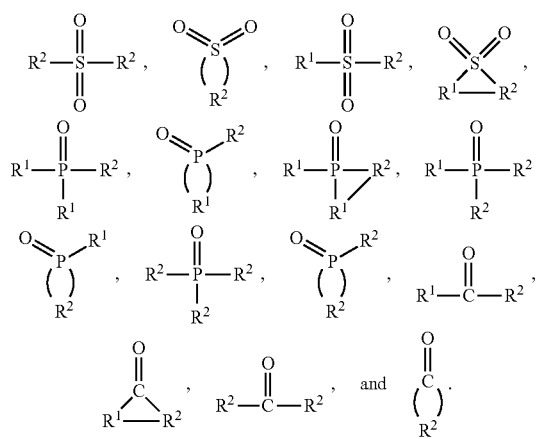

The groups

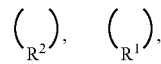

and —$R^1$—$R^2$— can each be independently —$R^4$—.

The hydrolyzable compound can be a compound having a structure chosen from

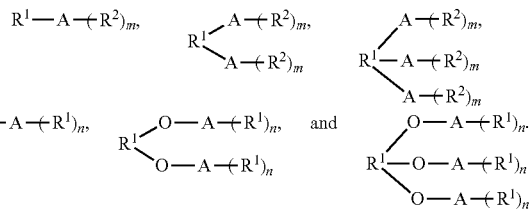

The hydrolyzable compound can be a compound having a structure chosen from

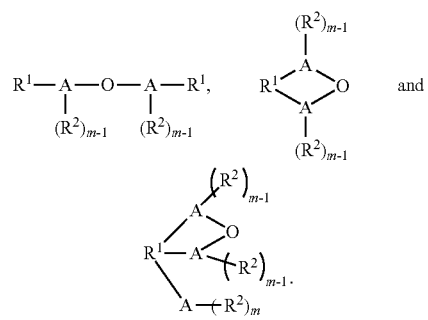

The hydrolyzable compound can be a compound having a structure chosen from

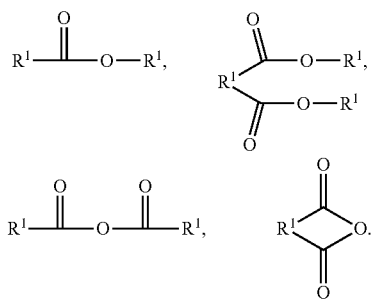

The hydrolyzable compound can be a polymer that includes a repeating unit having a structure chosen from

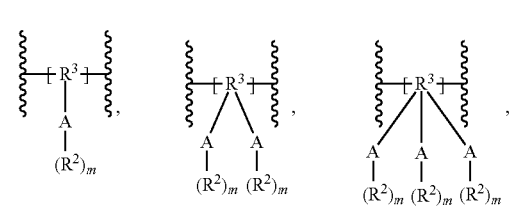

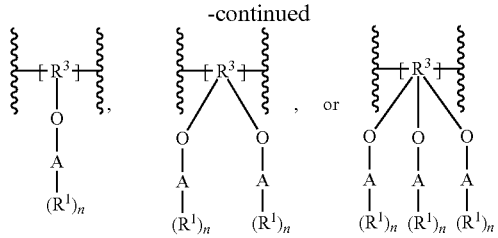

The hydrolyzable compound can be a polymer that includes a repeating unit having a structure chosen from

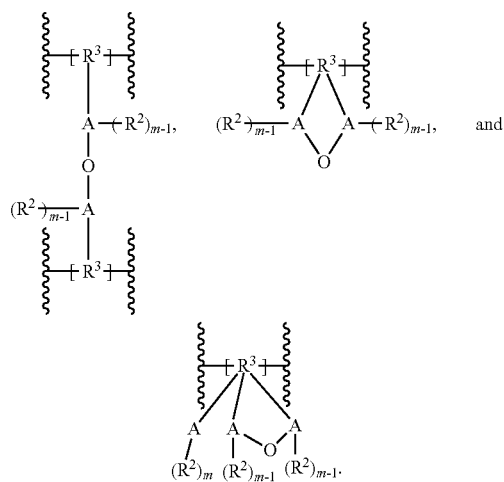

The hydrolyzable compound can be a polymer that includes a repeating unit having a structure chosen from

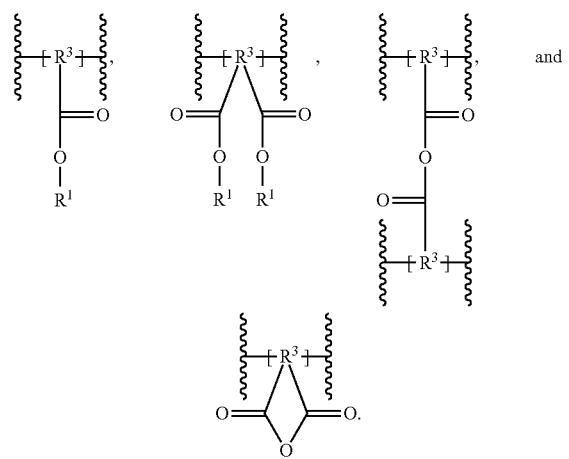

The hydrolyzable compound can be an acid anhydride, such as any suitable acid anhydride. For example, the acid anhydride can include at least one of a carboxylate, a sulfonate, a sulfate, a phosphate, and a phosphonate group. The acid anhydride can be phthalic anhydride, formic anhydride, acetic anhydride, maleic anhydride, acetic formic anhydride, a $(C_1\text{-}C_{20})$alkanoic $(C_1\text{-}C_{20})$alkanoic anhydride, propanoic acid anhydride, butanoic acid anhydride, pentanoic acid anhydride, hexanoic acid anhydride, octanoic acid anhydride, nonanoic acid anhydride, decanoic acid anhydride, salicylic acid anhydride, acrylic acid anhydride, aspartic acid anhydride, fumaric acid anhydride, methacrylic acid anhydride, hydroxypropyl acrylic acid anhydride, vinyl phosphonic acid anhydride, vinylidene diphosphonic acid anhydride, maleic anhydride, itaconic acid anhydride, crotonic acid anhydride, maleic acid anhydride, mesoconic acid anhydride, citraconic acid anhydride, styrene sulfonic acid anhydride, allyl sulfonic acid anhydride, methallyl sulfonic acid anhydride, or vinyl sulfonic acid anhydride.

The hydrolyzable compound can be a polymer, such as any suitable polymer. For example, the polymer can include at least one of a carboxylate, a sulfonate, a sulfate, a phosphate, and a phosphonate group. The hydrolyzable compound can be poly(lactic acid), polyglycolide, polycaprolactone, polyhydroxyalkanoate, polyhydroxybutyrate, polyethylene adipate, polybutylene succinate, poly(3-hydroxybutyrate-co-3-hydroxyvalerate), poly(maleic anhydride), or a substituted or unsubstituted $(C_1\text{-}C_{20})$hydrocarbyl ester of at least one of a poly(substituted or unsubstituted $(C_1\text{-}C_{20})$alkenoic acid), a substituted or unsubstituted $(C_1\text{-}C_{20})$alkenoic acid-substituted or unsubstituted $(C_1\text{-}C_{20})$alkenoic acid copolymer, poly(acrylic acid), poly(methacrylic acid), polyglycolic acid, poly(aspartic acid), poly(fumaric acid), poly(hydroxypropyl acrylic acid), poly(vinyl phosphonic acid), poly(vinylidene diphosphonic acid), poly(itaconic acid), poly(crotonic acid), poly(maleic acid), poly(mesoconic acid), poly(citraconic acid), poly(styrene sulfonic acid), poly(allyl sulfonic acid), poly(methallyl sulfonic acid), vinyl sulfonic acidacrylic acid-hydroxypropyl acrylate copolymer, hydrolyzed poly(maleic anhydride), maleic acid-acrylic acid copolymer, and acrylic acid-2-acrylamino-2-methylpropanesulfonic acid copolymer.

The hydrolyzable compound can be an ester, such as any suitable ester. For example, the ester can be a catechol ester, a resorcinol ester, substituted or unsubstituted $(C_1\text{-}C_{20})$ hydrocarbyl ester of a substituted or unsubstituted $(C_1\text{-}C_{20})$ alkanoic acid, p-toluene sulfonic acid, formic acid, acetic acid, propanoic acid, butanoic acid, pentanoic acid, hexanoic acid, octanoic acid, nonanoic acid, decanoic acid, acrylic acid, salicylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, or vinyl sulfonic acid.

Breaker.

In various embodiments, the composition including the hydrolyzable compound includes one or more breakers. The breaker can be present in the composition that is placed in the subterranean formation in any suitable amount, such that the composition can be used as described herein. For example, the one or more breakers can together be about 0.000,000.1 wt % to about 95 wt % of the composition, or about 0.001 wt % to about 80 wt % of the composition, or about 0.000,000.1 wt % of the composition or less, or about 0.000,001 wt % of the composition, or about 0.000.01 wt %, 0.000,1, 0.001, 0.01, 0.1, 1, 2, 3, 4, 5, 10, 15, 20, 25, 30, 35, 40, 45, 50, 55, 60, 65, 70, 75, 80, 85, 90, 95, 96, 97, 98, 99, 99.9, 99.99, 99.999, 99.999,9, 99.999,99, 99.999,999, or about 99.999,999.9 wt % or more of the composition. In some embodiments, the subterranean formation where the composition including the hydrolyzable compound is placed includes a breaker. After being placed in the subterranean formation, the hydrolyzable compound can be in fluid contact with the breaker. A breaker in the subterranean formation can be in fluid contact with a gel or crosslinked gel in the subterranean formation. The method can include breaking the crosslinked gel at least partially with the breaker, to provide a broken gel. The breaking can occur via any suitable mechanism. For example, breaking the gel can include at least one of breaking the intramolecular crosslinks between the molecules that are in the gel, and breaking the intramolecular bonds in the molecules that are in the gel.

The breaker can be any suitable breaker. For example, the breaker can be a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, or an $Al^{3+}$ salt of a chloride, fluoride, bromide, phosphate, or sulfate ion. In some examples, the breaker can be calcium chloride, sodium chloride, or potassium chloride. The breaker can be at least one of an oxidizer and an enzyme, such as any suitable oxidizer or enzyme. Examples of oxidative breakers can include a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, or an $Al^{3+}$ salt of a persulfate, percarbonate, perborate, peroxide, perphosphate, permanganate, chlorite, or hyperchlorite ion. In some examples, the oxidative breaker is ammonium persulfate. Examples of enzymatic breakers can include an alpha or beta amylases, amyloglucosidase, oligoglucosidase, invertase, maltase, cellulase, hemi-cellulase, or mannanohydrolase.

Downhole Mixture or Composition.

The composition including the hydrolyzable compound can be combined with any suitable downhole fluid before, during, or after the placement of the composition in the subterranean formation or the contacting of the composition and the subterranean material. In some examples, the hydrolyzable compound is combined with a downhole fluid above the surface, then the combined composition is placed in a subterranean formation or contacted with a subterranean material. In another example, the hydrolyzable compound is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

In various embodiments, the method includes combining the composition including the hydrolyzable compound with any suitable downhole fluid, such as an aqueous or oil-based fluid including a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture. The placement of the composition in the subterranean formation can include contacting the subterranean material and the mixture. The contacting of the subterranean material and the composition can include contacting the subterranean material and the mixture. A mixture that is placed in the subterranean formation or contacted with the subterranean material can include any suitable weight percent of the composition including the hydrolyzable compound, such as about 0.000,000.01 wt % to 99.999.99 wt %, 0.000,1-99.9 wt %, 0.1 wt % to 99.9 wt %, or about 20-90 wt %, or about 0.000,000.01 wt % or less, or about 0.000,001 wt %, 0.000,1, 0.001, 0.01, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99, 99.999, 99.999,9, or about 99.999.99 wt % or more of the composition.

In some embodiments, the composition can include any suitable amount of any suitable material used in a downhole fluid. For example, the composition can include water, saline, aqueous base, oil, organic solvent, synthetic fluid oil phase, aqueous solution, alcohol or polyol, cellulose, starch, alkalinity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, dispersants, salts, fibers, thixotropic additives, breakers, crosslinkers, rheology modifiers, curing accelerators, curing retarders, pH modifiers, chelating agents, scale inhibitors, enzymes, resisn, water control materials, oxidizers, markers, Portland cement, pozzolana cement, gypsum cement, high alumina content cement, slag cement, silica cement fly ash, metakaolin, shale, zeolite, a crystalline silica compound, amorphous silica, hydratable clays, microspheres, pozzolan lime, or a combination thereof.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks penetrated and also to form a thin, low permeability filter cake which temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g. barium sulfate), surfactants (e.g. betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g. silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture. The drilling fluid can be present in the mixture with the composition including the hydrolyzable compound in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, 99.999, or about 99.9999 wt % or more of the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents of additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 50:50 to about 95:5 by volume of oil phase to water phase. A substantially all oil mud includes about 100% liquid phase oil by volume; e.g., substantially no internal aqueous phase.

A pill is a relatively small quantity (e.g. less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

A cement fluid can include an aqueous mixture of at least one of cement and cement kiln dust. The composition including the hydrolyzable compound can form a useful combination with cement or cement kiln dust. The cement kiln dust can be any suitable cement kiln dust. Cement kiln dust can be formed during the manufacture of cement and can be partially calcined kiln feed which is removed from the gas stream and collected in a dust collector during manufacturing process. Cement kiln dust can be advantageously utilized in a cost-effective manner since kiln dust is often regarded as a low value waste product of the cement industry. Some embodiments of the cement fluid can include cement kiln dust but no cement, cement kiln dust and cement, or cement but no cement kiln dust. The cement can be any suitable cement. The cement can be a hydraulic cement. A variety of cements can be utilized in accordance with embodiments of the present invention, for example, those including calcium, aluminum, silicon, oxygen, iron, or sulfur, which can set and harden by reaction with water. Suitable cements can include Portland cements, pozzolana cements, gypsum cements, high alumina content cements, slag cements, silica cements, and combinations thereof. In some embodiments, the Portland cements that are suitable for use in embodiments of the present invention are classified as Classes A, C, H, and G cements according to the American Petroleum Institute, *API Specification for Materials and Testing for Well Cements*, API Specification 10, Fifth Ed., Jul. 1, 1990. A cement can be generally included in the cementing fluid in an amount sufficient to provide the desired compressive strength, density, or cost. In some embodiments, the hydraulic cement can be present in the cementing fluid in an amount in the range of from 0 wt % to about 100 wt %, 0-95 wt %, 20-95 wt %, or about 50-90 wt %. A cement kiln dust can be present in an amount of at least about 0.01 wt %, or about 5 wt %-80 wt %, or about 10 wt % to about 50 wt %.

Optionally, other additives can be added to a cement or kiln dust-containing composition of embodiments of the present invention as deemed appropriate by one skilled in the art, with the benefit of this disclosure. Any optional ingredient listed in this paragraph can be either present or not present in the composition. For example, the composition can include fly ash, metakaolin, shale, zeolite, set retarding additive, surfactant, a gas, accelerators, weight reducing additives, heavy-weight additives, lost circulation materials, filtration control additives, dispersants, and combinations thereof. In some examples, additives can include crystalline silica compounds, amorphous silica, salts, fibers, hydratable clays, microspheres, pozzolan lime, thixotropic additives, combinations thereof, and the like.

In various embodiments, the present invention can include a proppant, a resin-coated proppant, an encapsulated resin, or a combination thereof. A proppant is a material that keeps an induced hydraulic fracture at least partially open during or after a fracturing treatment. Proppants can be transported downhole to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, manmade materials such as ceramic proppant. In some embodiments, proppant can have an average particle size of about 0.15 mm to about 2.5 mm, about 0.25-0.43 mm, 0.43-0.85 mm, 0.85-1.18 mm, 1.18-1.70 mm, and 1.70-2.36 mm.

The composition can include a payload material. The payload can be deposited in any suitable downhole location. The method can include using the composition to deposit a payload material into a subterranean fracture. The subterranean fracture can be any suitable subterranean fraction. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, a density control agent, a density modifier, a surfactant, an emulsifier, a dispersant, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

System.

In various embodiments, the present invention provides a system. The system can include a composition including hydrolyzable compound comprising at least one of an ester and an anhydride, such as any hydrolyzable compound described herein. The system can also include a subterranean formation including the composition therein. In some embodiments, the subterranean formation can also include at least one of a downhole fluid and a crosslinked gel or gel.
Composition for Treatment of a Subterranean Formation.

Various embodiments provide a composition for treatment of a subterranean formation. The composition can be any suitable composition that can be used to perform an embodiment of the method for treatment of a subterranean formation described herein. For example, the composition can include a hydrolyzable compound comprising at least one of an ester and an anhydride, such as any hydrolyzable compound described herein.

The composition can be a composition for fracturing of a subterranean formation. The composition can be a composition for removing crosslinked gel from a subterranean formation. In some embodiments, the composition further includes a downhole fluid. The downhole fluid can be any suitable downhole fluid. In some embodiments, the downhole fluid is a composition for fracturing or a subterranean material, or a fracturing fluid. In some embodiments, the composition further includes a gel or crosslinked gel, such as any gel or crosslinked gel described herein.

Method for Preparing a Composition for Treatment of a Subterranean Formation.

In various embodiments, the present invention provides a method for preparing a composition for treatment of a subterranean formation. The method can be any suitable method that produces a composition described herein. For example, the method can include forming a composition including a hydrolyzable compound, such as any hydrolyzable compound described herein. In some examples, the formed composition can include at least one of downhole fluid and a gel or crosslinked gel, such as any downhole fluid, gel, or crosslinked gel described herein.

EXAMPLES

The present invention can be better understood by reference to the following Examples which are offered by way of illustration. The present invention is not limited to the Examples given herein.

Example 1

Guar in a concentration of 10 lb/1000 gal was crosslinked with 4 gal/1000 gal boronic acid-derivatized polyacrylamide crosslinker (1% m/m designer boronic acid monomer, 99% m/m acrylamide) at 140° F. Phthalic anhydride was added in various concentrations as pH control additive.

FIG. 1 shows degradation profile of the crosslinked gel. With time and temperature, the phthalic anhydride hydrolyzed and generated acid, resulting in pH lowering and subsequent de-crosslinking. Increasing the concentration of phthalic anhydride (6 pounds per thousand gallons, "pptg") resulted in decreased viscosity due to a lower pH (~7.5) of the resulting fluid compared to gel having a lower concentration of phthalic anhydride (3 pptg, pH=9.5).

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

Additional Embodiments

The present invention provides for the following exemplary embodiments, the numbering of which is not to be construed as designating levels of importance:

Embodiment 1 provides a method of treating a subterranean formation, the method comprising: obtaining or providing a composition comprising a hydrolyzable compound comprising at least one of an ester and an anhydride; placing the composition in a subterranean formation; and at least partially hydrolyzing the hydrolyzable compound to reduce pH downhole.

Embodiment 2 provides the method of Embodiment 1, wherein the method is a method of breaking a crosslinked gel downhole.

Embodiment 3 provides the method of any one of Embodiments 1-2, wherein the method is a method of at least partially removing a crosslinked gel from the subterranean formation.

Embodiment 4 provides the method of any one of Embodiments 1-3, wherein the method comprises, at least one of prior to, during, and after the placement of the composition in the subterranean formation, hydraulic fracturing.

Embodiment 5 provides the method of any one of Embodiments 1-4, wherein the subterranean formation comprises a fracture, flow pathway, area surrounding a fracture, and an area surrounding a flow pathway.

Embodiment 6 provides the method of any one of Embodiments 1-5, wherein the obtaining or providing of the composition occurs above-surface.

Embodiment 7 provides the method of any one of Embodiments 1-6, wherein the obtaining or providing of the composition occurs downhole.

Embodiment 8 provides the method of any one of Embodiments 1-7, wherein the reduction in pH occurs at least one of during and after the placement of the composition in the subterranean formation.

Embodiment 9 provides the method of any one of Embodiments 1-8, wherein the reducing of the pH downhole comprises a reduction in pH of about 0.01-20.

Embodiment 10 provides the method of any one of Embodiments 1-9, wherein the reducing of the pH downhole comprises a reduction in pH of about 0.1-5.

Embodiment 11 provides the method of any one of Embodiments 1-10, wherein the reducing of the pH downhole occurs over a period of about 1 second to 7 days.

Embodiment 12 provides the method of any one of Embodiments 1-11, wherein the reducing of the pH downhole occurs over a period of about 1 minute to about 2 days.

Embodiment 13 provides the method of any one of Embodiments 1-12, wherein the hydrolyzable compound is about 0.000,000.1 wt % to about 100 wt % of the composition.

Embodiment 14 provides the method of any one of Embodiments 1-13, wherein the hydrolyzable compound is about 0.001 wt % to about 20 wt % of the composition.

Embodiment 15 provides the method of any one of Embodiments 1-14, wherein the composition comprising the hydrolyzable compound comprises a crosslinked gel.

Embodiment 16 provides the method of any one of Embodiments 1-15, wherein the subterranean formation comprises a proppant.

Embodiment 17 provides the method of any one of Embodiments 1-16, wherein the subterranean formation comprises a crosslinked gel.

Embodiment 18 provides the method of Embodiment 17, wherein the placing of the composition in the subterranean formation comprises contacting the crosslinked gel and the composition.

Embodiment 19 provides the method of any one of Embodiments 17-18, wherein the composition comprising the hydrolyzable compound comprises the crosslinked gel, wherein after placing the composition in the subterranean formation the subterranean formation comprises the composition comprising the crosslinked gel.

Embodiment 20 provides the method of any one of Embodiments 17-19, wherein the method further comprises, at least one of prior, during, or after the placing of the composition in the subterranean formation, hydraulic fracturing using a composition comprising the crosslinked gel.

Embodiment 21 provides the method of any one of Embodiments 17-20, wherein the reduction of pH at least one of reduces the viscosity of the crosslinked gel and at least partially breaks the crosslinked gel, wherein after the reduction in viscosity or breaking the method comprises at least partially removing the crosslinked gel from the subterranean formation.

Embodiment 22 provides the method of Embodiment 21, wherein the removing of the crosslinked gel comprises at least one of diluting and flushing the crosslinked gel away from the subterranean formation using an aqueous solution injected downhole, injection of an oxidative breaker, and injection of an enzymatic breaker.

Embodiment 23 provides the method of any one of Embodiments 17-22, wherein the reduction in pH comprises a pH of the crosslinked gel before the pH reduction of greater than or equal to about 8 to about 20 and a pH of the crosslinked gel after the pH reduction of about 1 to less than 8.

Embodiment 24 provides the method of any one of Embodiments 17-23, wherein the reduction in pH comprises a pH of the crosslinked gel before the pH reduction of greater than or equal to about 8 to about 13 and a pH of the crosslinked gel after the pH reduction of about 2 to less than 8.

Embodiment 25 provides the method of any one of Embodiments 17-24, further comprising, at least one of during or after the hydrolysis of the hydrolyzable compound, at least partially breaking the crosslinked gel to provide a broken gel.

Embodiment 26 provides the method of Embodiment 25, further comprising recovering the broken gel, wherein the broken gel remains substantially broken during transit to above-surface.

Embodiment 27 provides the method of Embodiment 26, wherein recovering comprises cooling the broken gel to a temperature of about 20° F. to about 150° F.

Embodiment 28 provides the method of any one of Embodiments 26-27, wherein recovering comprises cooling the broken gel to a temperature of about 30° F. to about 50° F.

Embodiment 29 provides the method of any one of Embodiments 25-28, wherein the reduction of the pH downhole at least partially breaks the crosslinked gel to provide the broken gel.

Embodiment 30 provides the method of any one of Embodiments 25-29, wherein the broken gel has a reduced viscosity compared to the crosslinked gel.

Embodiment 31 provides the method of Embodiment 30, wherein the crosslinked gel has a viscosity of about 100 cP to about 1,000,000,000 cP.

Embodiment 32 provides the method of any one of Embodiments 30-31, wherein the reduced viscosity comprises a reduction of viscosity under downhole conditions of about 100 cP to about 1,000,000,000 cP.

Embodiment 33 provides the method of any one of Embodiments 30-32, wherein the reduced viscosity comprises a reduction of viscosity under downhole conditions of about 0.01 cP to about 1,500 cP.

Embodiment 34 provides the method of any one of Embodiments 30-33, wherein the broken gel has a viscosity of about 0.01 cP to about 1,500 cP under downhole conditions.

Embodiment 35 provides the method of any one of Embodiments 30-34, wherein the broken gel has a viscosity of about 0.05 cP to about 100 cP under downhole conditions.

Embodiment 36 provides the method of any one of Embodiments 30-35, wherein conditions downhole comprise a temperature of about 20° F. to about 300° F.

Embodiment 37 provides the method of any one of Embodiments 30-36, wherein conditions downhole comprise a temperature of about 50° F. to about 150° F.

Embodiment 38 provides the method of any one of Embodiments 17-37, wherein the crosslinked gel comprises at least one of a linear polysaccharide and a poly($(C_2-C_{10})$ alkenylene), wherein the $(C_2-C_{10})$alkenylene is substituted or unsubstituted.

Embodiment 39 provides the method of any one of Embodiments 17-38, wherein the crosslinked gel comprises at least one of poly(acrylic acid) or $(C_1-C_5)$alkyl esters thereof, poly(methacrylic acid) or $(C_1-C_5)$alkyl esters thereof, poly(vinyl acetate), poly(vinyl alcohol), poly(ethylene glycol), poly(vinyl pyrrolidone), polyacrylamide, poly(hydroxyethyl methacrylate), acetan, alginate, chitosan, curdlan, a cyclosophoran, dextran, emulsan, a galactoglucopolysaccharide, gellan, glucuronan, N-acetyl-glucosamine, N-acetyl-heparosan, hyaluronic acid, indicant, kefiran, lentinan, levan, mauran, pullulan, scleroglucan, schizophyllan, stewartan, succinoglycan, xanthan, welan, starch, tamarind, tragacanth, guar gum, derivatized guar, gum ghatti, gum arabic, locust bean gum, cellulose, and derivatized cellulose.

Embodiment 40 provides the method of any one of Embodiments 17-39, wherein the crosslinked gel comprises at least one of cellulose, carboxymethyl cellulose, hydroxyethyl cellulose, carboxymethyl hydroxyethyl cellulose, hydroxypropyl cellulose, methyl hydroxyl ethyl cellulose, guar, hydroxypropyl guar, carboxy methyl guar, and carboxymethyl hydroxylpropyl guar.

Embodiment 41 provides the method of any one of Embodiments 17-40, wherein the crosslinked gel comprises a crosslinker.

Embodiment 42 provides the method of Embodiment 41, wherein the crosslinker comprises at least one of chromium, aluminum, antimony, zirconium, titanium, calcium, boron, iron, silicon, copper, zinc, magnesium, and an ion thereof.

Embodiment 43 provides the method of Embodiment 42, wherein the crosslinker comprises at least one of boric acid, borax, a borate, a $(C_1-C_{30})$hydrocarbylboronic acid, a $(C_1-C_{30})$hydrocarbyl ester of a $(C_1-C_{30})$hydrocarbylboronic acid, a $(C_1-C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, and zirconium lactate glycolate, titanium lactate, titanium malate, titanium citrate, titanium ammonium lactate, titanium triethanolamine, titanium acetylacetonate, aluminum lactate, and aluminum citrate.

Embodiment 44 provides the method of any one of Embodiments 1-43, wherein the hydrolyzable compound comprises at least one of a carboxylate, a sulfonate, a sulfate, a phosphate, and a phosphonate.

Embodiment 45 provides the method of any one of Embodiments 1-44, wherein the hydrolyzable compound comprises a polymer comprising at least one of a carboxylate, a sulfonate, a sulfate, a phosphate, phosphonate moiety.

Embodiment 46 provides the method of any one of Embodiments 1-45, wherein the hydrolyzable compound is selected from the group consisting of

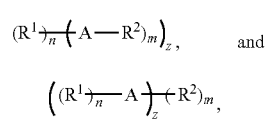

Structure I

Structure II wherein at each occurrence $R^1$ is independently selected from the group consisting of a monovalent, divalent, or trivalent $R^4$ group, wherein at each occurrence $R^4$ is independently selected from $(C_1-C_{20})$hydrocarbyl, $(C_0-C_{20})$hydrocarbyl$(C_5-C_{20})$aryl$(C_0-C_{20})$hydrocarbyl, and $(C_0-C_{20})$hydrocarbyl$(C_5-C_{20})$heteroaryl$(C_0-C_{20})$hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N, a polymer comprising a repeating unit having a structure selected from the group consisting of

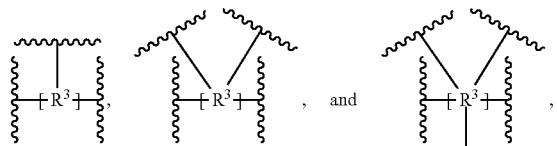

wherein $R^3$ is a trivalent, tetravalent, or pentavalent $R^4$ group, $R^1$ together with one or two other $R^1$ groups bonded to the same A group or to a different A group is a divalent or trivalent $R^4$ group, and $R^1$ together with an $R^2$ group bonded to the same A group or to a different A group is a divalent $R^4$ group; and at each occurrence $R^2$ is independently selected from the group consisting of

—OH,

—OR$^1$, $R^2$ together with an $R^1$ group bonded to the same A group or to a different A group is a divalent $R^4$ group, and $R^2$ together with an $R^1$ group bonded to a different A group is an —O— group;

at each occurrence z is independently 1, 2, or 3; and at each occurrence A is independently selected from the group consisting of

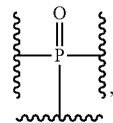

wherein n+m=3, n at each occurrence is independently 0, 1, or 2, and m at each occurrence is independently 1, 2, or 3,

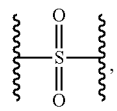

wherein n+m=2, n at each occurrence is independently 0 or 1, and m at each occurrence is independently 1 or 2, and

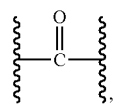

wherein n+m=2, n at each occurrence is independently 1 or 0, and m at each occurrence is independently 1 or 2.

Embodiment 47 provides the method of Embodiment 46, wherein the hydrolyzable compound is selected from the group consisting of

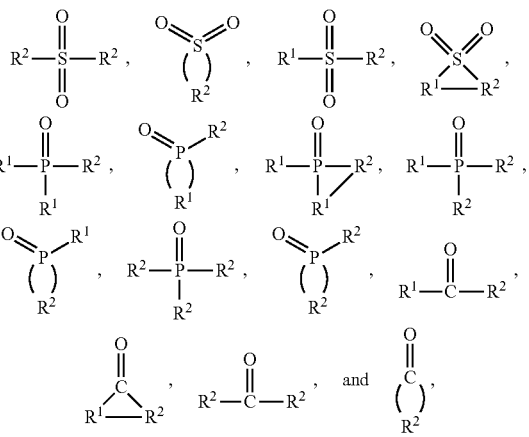

wherein

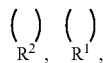

and —$R^1$—$R^2$— are each independently —$R^4$—.

Embodiment 48 provides the method of any one of Embodiments 46-47, wherein the hydrolyzable compound is a compound having a structure selected from the group consisting of

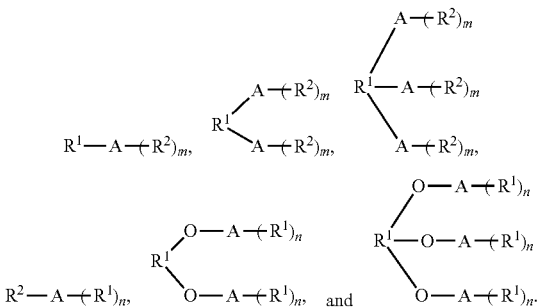

Embodiment 49 provides the method of any one of Embodiments 46-48, wherein the hydrolyzable compound is a compound having a structure selected from the group consisting of

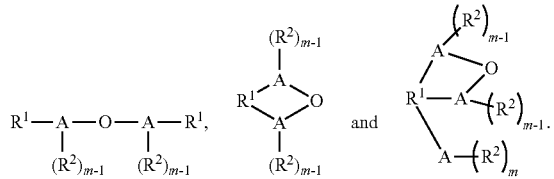

Embodiment 50 provides the method of any one of Embodiments 46-49, wherein the hydrolyzable compound is a compound having a structure selected from the group consisting of

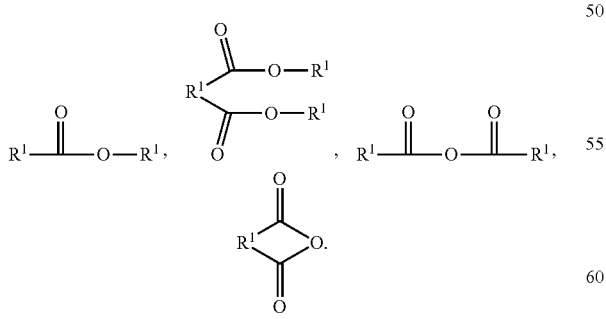

Embodiment 51 provides the method of any one of Embodiments 46-50, wherein the hydrolyzable compound is a polymer comprising a repeating unit having a structure selected from the group consisting of

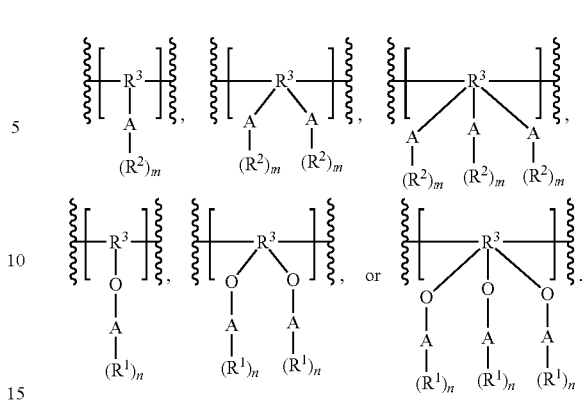

Embodiment 52 provides the method of any one of Embodiments 46-51, wherein the hydrolyzable compound is a polymer comprising a repeating unit having a structure selected from the group consisting of

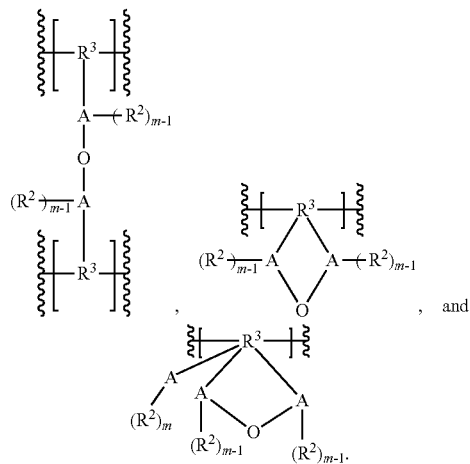

Embodiment 53 provides the method of any one of Embodiments 46-52, wherein the hydrolyzable compound is a polymer comprising a repeating unit having a structure selected from the group consisting of

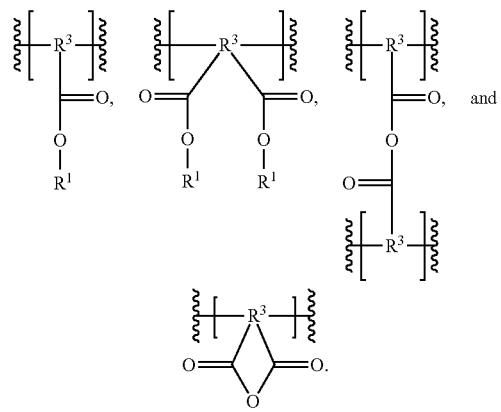

Embodiment 54 provides the method of any one of Embodiments 46-53, wherein at each occurrence $R^1$ is a group independently selected from ($C_1$-$C_{20}$)alkyl, ($C_0$-$C_{20}$)

alkyl($C_5$-$C_{20}$)aryl($C_0$-$C_{20}$)alkyl, and ($C_0$-$C_{20}$)alkyl($C_5$-$C_{20}$) heteroaryl($C_0$-$C_{20}$)alkyl, wherein each alkyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N.

Embodiment 55 provides the method of any one of Embodiments 46-54, wherein at each occurrence $R^1$ is a group independently selected from the group consisting of ($C_1$-$C_{10}$)alkyl and ($C_0$-$C_{10}$)alkyl($C_5$-$C_{10}$)aryl($C_0$-$C_{10}$)alkyl.

Embodiment 56 provides the method of any one of Embodiments 46-55, wherein at each occurrence $R^1$ is independently ($C_2$-$C_5$)alkyl.

Embodiment 57 provides the method of any one of Embodiments 46-56, wherein at each occurrence $R^4$ is a group independently selected from ($C_2$-$C_{20}$)alkyl, ($C_0$-$C_{20}$)alkyl($C_5$-$C_{20}$)aryl($C_0$-$C_{20}$)alkyl, and ($C_0$-$C_{20}$)alkyl($C_5$-$C_{20}$)heteroaryl($C_0$-$C_{20}$)alkyl, wherein each alkyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N.

Embodiment 58 provides the method of any one of Embodiments 46-57, wherein at each occurrence $R^4$ is a group independently selected from the group consisting of ($C_2$-$C_{10}$)alkyl, and ($C_0$-$C_{10}$)alkyl($C_5$-$C_{10}$)aryl($C_0$-$C_{10}$)alkyl.

Embodiment 59 provides the method of any one of Embodiments 46-58, wherein at each occurrence $R^4$ is independently ($C_2$-$C_5$)alkyl.

Embodiment 60 provides the method of any one of Embodiments 46-59, wherein at each occurrence $R^4$ is independently substituted or unsubstituted ethyl, or substituted or unsubstituted phenyl.

Embodiment 61 provides the method of any one of Embodiments 46-60, wherein at each occurrence $R^1$ is independently selected from the group consisting of phenyl, methyl, ethyl, propyl, and butyl.

Embodiment 62 provides the method of any one of Embodiments 46-61, wherein A is carbonyl (—C(O)—), n=1, and m=1.

Embodiment 63 provides the method of any one of Embodiments 1-62, wherein the hydrolyzable compound is an acid anhydride comprising at least one of a carboxylate, a sulfonate, a sulfate, a phosphate, and a phosphonate group.

Embodiment 64 provides the method of Embodiment 63, wherein the acid anhydride is at least one of phthalic anhydride, formic anhydride, acetic anhydride, maleic anhydride, acetic formic anhydride, a ($C_1$-$C_{20}$)alkanoic ($C_1$-$C_{20}$) alkanoic anhydride, propanoic acid anhydride, butanoic acid anhydride, pentanoic acid anhydride, hexanoic acid anhydride, octanoic acid anhydride, nonanoic acid anhydride, decanoic acid anhydride, salicylic acid anhydride, acrylic acid anhydride, aspartic acid anhydride, fumaric acid anhydride, methacrylic acid anhydride, hydroxypropyl acrylic acid anhydride, vinyl phosphonic acid anhydride, vinylidene diphosphonic acid anhydride, maleic anhydride, itaconic acid anhydride, crotonic acid anhydride, maleic acid anhydride, mesoconic acid anhydride, citraconic acid anhydride, styrene sulfonic acid anhydride, allyl sulfonic acid anhydride, methallyl sulfonic acid anhydride, and vinyl sulfonic acid anhydride.

Embodiment 65 provides the method of any one of Embodiments 1-64, wherein the hydrolyzable compound is a polymer comprising at least one of a carboxylate, a sulfonate, a sulfate, a phosphate, and a phosphonate group.

Embodiment 66 provides the method of Embodiment 65, wherein the hydrolyzable compound is poly(lactic acid), polyglycolide, polycaprolactone, polyhydroxyalkanoate, polyhydroxybutyrate, polyethylene adipate, polybutylene succinate, poly(3-hydroxybutyrate-co-3-hydroxyvalerate), poly(maleic anhydride), and a substituted or unsubstituted ($C_1$-$C_{20}$)hydrocarbyl ester of at least one of a poly(substituted or unsubstituted ($C_1$-$C_{20}$)alkenoic acid), a substituted or unsubstituted ($C_1$-$C_{20}$)alkenoic acid-substituted or unsubstituted ($C_1$-$C_{20}$)alkenoic acid copolymer, poly(acrylic acid), poly(methacrylic acid), polyglycolic acid, poly(aspartic acid), poly(fumaric acid), poly(hydroxypropyl acrylic acid), poly(vinyl phosphonic acid), poly(vinylidene diphosphonic acid), poly(itaconic acid), poly(crotonic acid), poly(maleic acid), poly(mesoconic acid), poly(citraconic acid), poly(styrene sulfonic acid), poly(allyl sulfonic acid), poly(methallyl sulfonic acid), vinyl sulfonic acidacrylic acid-hydroxypropyl acrylate copolymer, hydrolyzed poly(maleic anhydride), maleic acid-acrylic acid copolymer, and acrylic acid-2-acrylamino-2-methylpropanesulfonic acid copolymer.

Embodiment 67 provides the method of any one of Embodiments 1-66, wherein the hydrolyzable compound is a catechol ester, a resorcinol ester, substituted or unsubstituted ($C_1$-$C_{20}$)hydrocarbyl ester of at least one of a substituted or unsubstituted ($C_1$-$C_{20}$)alkanoic acid, p-toluene sulfonic acid, formic acid, acetic acid, propanoic acid, butanoic acid, pentanoic acid, hexanoic acid, octanoic acid, nonanoic acid, decanoic acid, salicylic acid, acrylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, and vinyl sulfonic acid.

Embodiment 68 provides the method of any one of Embodiments 1-67, further comprising triggering the hydrolysis of the hydrolyzable compound.

Embodiment 69 provides the method of Embodiment 68, wherein the triggering comprises exposing at least some of the composition to at least one of a chemical activator, heat, pH change, passage of time, and vibration.

Embodiment 70 provides the method of any one of Embodiments 68-69, wherein the triggering occurs at least one of during and after placing the composition in at least one of a fracture, at least a part of an area surrounding a fracture, a flow pathway, an area surrounding a flow pathway, and an area desired to be fractured.

Embodiment 71 provides the method of any one of Embodiments 1-70, wherein the composition comprises a protective shell encapsulating the hydrolyzable compound.

Embodiment 72 provides the method of Embodiment 71, comprising triggering the hydrolysis of the hydrolyzable compound comprising breaking or chemically dissolving at least part of the protective shell.

Embodiment 73 provides the method of any one of Embodiments 71-72, wherein the protective shell at least partially protects the hydrolyzable compound from the surrounding environment.

Embodiment 74 provides the method of any one of Embodiments 71-73, wherein the protective shell is substantially uniform.

Embodiment 75 provides the method of any one of Embodiments 71-74, wherein the protective shell substantially covers the hydrolyzable compound.

Embodiment 76 provides the method of any one of Embodiments 71-75, wherein the encapsulated hydrolyzable compound is a nanoparticle.

Embodiment 77 provides the method of any one of Embodiments 71-76, wherein the encapsulated hydrolyzable compound has a particle size of about 0.1 nm to about 10 mm.

Embodiment 78 provides the method of any one of Embodiments 71-77, wherein the encapsulated hydrolyzable compound has a particle size of about 1 nm to about 5 mm.

Embodiment 79 provides the method of any one of Embodiments 1-78, wherein the composition comprises at least one of water, brine, an aqueous liquid, an alcohol, a base, and an acid.

Embodiment 80 provides the method of any one of Embodiments 1-79, wherein the composition further comprises a breaker.

Embodiment 81 provides the method of Embodiment 80, wherein the breaker comprises at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion.

Embodiment 82 provides the method of any one of Embodiments 80-81, wherein the breaker comprises at least one of an oxidative breaker and an enzymatic breaker.

Embodiment 83 provides the method of Embodiment 82, wherein the oxidative breaker is at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hyperchlorite ion.

Embodiment 84 provides the method of any one of Embodiments 82-83, wherein the enzyme is at least one of an alpha or beta amylase, amyloglucosidase, oligoglucosidase, invertase, maltase, cellulase, hemi-cellulase, and mannanohydrolase.

Embodiment 85 provides the method of any one of Embodiments 1-84, further comprising combining the composition with an aqueous or oil-based fluid comprising a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof, to form a mixture, wherein the placing of the composition in the subterranean formation comprises placing the mixture in the subterranean formation.

Embodiment 86 provides the method of Embodiment 85, wherein the cementing fluid comprises Portland cement, pozzolana cement, gypsum cement, high alumina content cement, slag cement, silica cement, or a combination thereof.

Embodiment 87 provides the method of any one of Embodiments 1-86, wherein at least one of prior to, during, and after the placing of the composition in the subterranean formation, the composition is used downhole, at least one of alone and in combination with other materials, as a drilling fluid, stimulation fluid, fracturing fluid, spotting fluid, clean-up fluid, production fluid, completion fluid, remedial treatment fluid, abandonment fluid, pill, acidizing fluid, cementing fluid, packer fluid, or a combination thereof.

Embodiment 88 provides the method of any one of Embodiments 1-87, wherein the composition further comprises water, saline, aqueous base, oil, organic solvent, synthetic fluid oil phase, aqueous solution, alcohol or polyol, cellulose, starch, alkalinity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, gas, weight reducing additive, heavy-weight additive, lost circulation material, filtration control additive, dispersant, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement fly ash, metakaolin, shale, zeolite, a crystalline silica compound, amorphous silica, fibers, a hydratable clay, microspheres, pozzolan lime, or a combination thereof.

Embodiment 89 provides the method of any one of Embodiments 1-88, wherein the placing of the composition in the subterranean formation comprises fracturing at least part of the subterranean formation to form at least one subterranean fracture.

Embodiment 90 provides the method of any one of Embodiments 1-89, wherein the composition further comprises a proppant, a resin-coated proppant, an encapsulated resin, or a combination thereof.

Embodiment 91 provides a method of treating a subterranean formation, the method comprising: obtaining or providing a composition comprising a hydrolyzable compound comprising at least one of an ester and an anhydride; placing the composition in a subterranean formation comprising a crosslinked gel; at least partially hydrolyzing the hydrolyzable compound to reduce the pH downhole; at least partially breaking the crosslinked gel to provide a broken gel; and at least partially removing the broken gel from the subterranean formation.

Embodiment 92. A method of treating a subterranean formation, the method comprising: obtaining or providing a composition comprising a hydrolyzable compound comprising at least one of an ester and an anhydride, the compound selected from the group consisting of

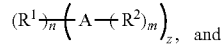, and

Structure I

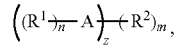,

Structure II wherein at each occurrence $R^1$ is independently selected from the group consisting of a monovalent, divalent, or trivalent $R^4$ group, wherein at each occurrence $R^4$ is independently selected from $(C_1-C_{20})$hydrocarbyl, $(C_0-C_{20})$hydrocarbyl$(C_5-C_{20})$aryl$(C_0-C_{20})$hydrocarbyl, and $(C_0-C_{20})$hydrocarbyl$(C_5-C_{20})$heteroaryl$(C_0-C_{20})$hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from O, S, and substituted or unsubstituted N, a polymer comprising a repeating unit having a structure selected from the group consisting of

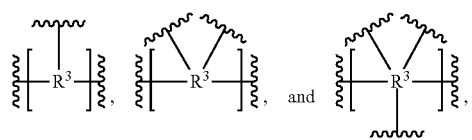

wherein $R^3$ is a trivalent, tetravalent, or pentavalent $R^4$ group, $R^1$ together with one or two other $R^1$ groups bonded to the same A group or to a different A group is a divalent or trivalent $R^4$ group, and $R^1$ together with an $R^2$ group bonded to the same A group or to a different A group is a divalent $R^4$ group; and at each occurrence $R^2$ is independently selected from the group consisting of

—OH,

—OR$^1$, $R^2$ together with an $R^1$ group bonded to the same A group or to a different A group is a divalent $R^4$ group, and $R^2$ together with an $R^1$ group bonded to a different A group is an —O— group;

at each occurrence z is independently 1, 2, or 3; and at each occurrence A is independently selected from the group consisting of

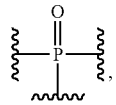

wherein n+m=3, n at each occurrence is independently 0, 1, or 2, and m at each occurrence is independently 1, 2, or 3,

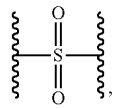

wherein n+m=2, n at each occurrence is independently 0 or 1, and m at each occurrence is independently 1 or 2, and

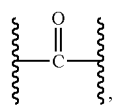

wherein n+m=2, n at each occurrence is independently 1 or 0, and m at each occurrence is independently 1 or 2;

placing the composition in a subterranean formation; and
at least partially hydrolyzing the hydrolyzable compound to reduce the pH downhole.

Embodiment 93 provides a system comprising: a composition comprising a hydrolyzable compound comprising at least one of an ester and an anhydride; and a subterranean formation comprising the composition therein.

Embodiment 94 provides a composition for treatment of a subterranean formation, the composition comprising: a hydrolyzable compound comprising at least one of an ester and an anhydride.

Embodiment 95 provides the composition of Embodiment 94, wherein the composition further comprises a downhole fluid.

Embodiment 96 provides the composition of any one of Embodiments 94-95, wherein the composition further comprises a gel or crosslinked gel.

Embodiment 97 provides the composition of any one of Embodiments 94-96, wherein the composition is a composition for fracturing of a subterranean formation.

Embodiment 98 provides the composition of any one of Embodiments 94-97, wherein the composition is a composition for removing crosslinked gel from a subterranean formation.

Embodiment 99 provides a method of preparing a composition for treatment of a subterranean formation, the method comprising: forming a composition comprising a hydrolyzable compound comprising at least one of an ester and an anhydride.

Embodiment 100 provides the apparatus or method of any one or any combination of Embodiments 1-99 optionally configured such that all elements or options recited are available to use or select from.

What is claimed is:

1. A method of treating a subterranean formation, the method comprising:

placing in the subterranean formation a composition comprising a hydrolyzable compound comprising at least one of an ester and an anhydride;

at least partially hydrolyzing the hydrolyzable compound to reduce pH in the subterranean formation;

hydraulically fracturing the subterranean formation with the composition to generate a flow path in the subterranean formation; and wherein the hydrolyzable compound is selected from the group consisting of:

$$(R^1)_n{-}(A{-}(R^2)_m)_z, \text{ and} \qquad \text{Structure I}$$

$$((R^1)_n{-}A)_z{-}(R^2)_m, \qquad \text{Structure II}$$

wherein:

at each occurrence $R^1$ is independently selected from the group consisting of:

a monovalent, divalent, or trivalent $R^4$ group, wherein at each occurrence $R^4$ is independently selected from the group consisting of ($C_1$-$C_{20}$)hydrocarbyl, ($C_0$-$C_{20}$)hydrocarbyl($C_5$-$C_{20}$)aryl ($C_0$-$C_{20}$)hydrocarbyl, and ($C_0$-$C_{20}$)hydrocarbyl($C_5$-$C_{20}$)heteroaryl($C_0$-$C_{20}$)hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from the group consisting of O, S, and substituted or unsubstituted N, a polymer comprising a repeating unit having a structure selected from the group consisting of:

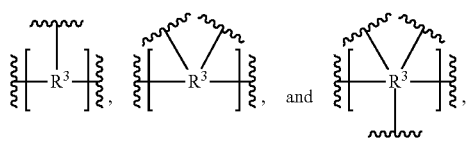

wherein R³ is a trivalent, tetravalent, or pentavalent R⁴ group,

R¹ together with one or two other R¹ groups bonded to the same A group or to a different A group is a divalent or trivalent R⁴ group, and R¹ together with an R² group bonded to the same A group or to a different A group is a divalent R⁴ group; and at each occurrence R² is independently selected from the group consisting of:
—OH,
—OR¹, R² together with an R¹ group bonded to the same A group or to a different A group is a divalent R⁴ group, and R² together with an R¹ group bonded to a different A group is an —O— group;

at each occurrence z is independently 1, 2, or 3; and at each occurrence A is independently selected from the group consisting of:

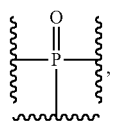

wherein n+m=3, n at each occurrence is independently 0, 1, or 2, and m at each occurrence is independently 1, 2, or 3,

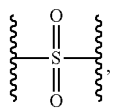

wherein n+m=2, n at each occurrence is independently 0 or 1, and m at each occurrence is independently 1 or 2, and

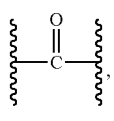

wherein n+m=2, n at each occurrence is independently 0 or 1, and m at each occurrence is independently 1 or 2.

2. The method of claim 1, wherein the hydraulically fracturing further comprises transporting a proppant into the flow path.

3. The method of claim 1, wherein the subterranean formation comprises a crosslinked gel, wherein the reduction of pH at least one of reduces the viscosity of the crosslinked gel and at least partially breaks the crosslinked gel.

4. The method of claim 1, wherein the hydrolyzable compound further comprises at least one of a carboxylate, a sulfonate, a sulfate, a phosphate, or a phosphonate.

5. The method of claim 1, wherein the hydrolyzable compound is an acid anhydride.

6. The method of claim 1, wherein the hydrolyzable compound is selected from the group consisting of poly (lactic acid), polyglycolide, polycaprolactone, polyhydroxyalkanoate, polyhydroxybutyrate, polyethylene adipate, polybutylene succinate, poly(3-hydroxybutyrate-co-3-hydroxyvalerate), poly(maleic anhydride), and a substituted or unsubstituted ($C_1$-$C_{20}$)hydrocarbyl ester of at least one of a poly(substituted or unsubstituted ($C_1$-$C_{20}$)alkenoic acid), a substituted or unsubstituted ($C_1$-$C_{20}$)alkenoic acid-substituted or unsubstituted ($C_1$-$C_{20}$)alkenoic acid copolymer, poly(acrylic acid), poly(methacrylic acid), polyglycolic acid, poly(aspartic acid), poly(fumaric acid), poly(hydroxypropyl acrylic acid), poly(vinyl phosphonic acid), poly(vinylidene diphosphonic acid), poly(itaconic acid), poly(crotonic acid), poly(maleic acid), poly(mesoconic acid), poly (citraconic acid), poly(styrene sulfonic acid), poly(allyl sulfonic acid), poly(methallyl sulfonic acid), vinyl sulfonic acidacrylic acid-hydroxypropyl acrylate copolymer, hydrolyzed poly(maleic anhydride), maleic acid-acrylic acid copolymer, or acrylic acid-2-acrylamino-2-methylpropanesulfonic acid copolymer.

7. The method of claim 1, wherein the hydrolyzable compound is selected from the group consisting of a catechol ester, a resorcinol ester, and a substituted or unsubstituted ($C_1$-$C_{20}$)hydrocarbyl ester of at least one of a substituted or unsubstituted ($C_1$-$C_{20}$)alkanoic acid, p-toluene sulfonic acid, formic acid, acetic acid, propanoic acid, butanoic acid, pentanoic acid, hexanoic acid, octanoic acid, nonanoic acid, decanoic acid, salicylic acid, acrylic acid, aspartic acid, fumaric acid, methacrylic acid, hydroxypropyl acrylic acid, vinyl phosphonic acid, vinylidene diphosphonic acid, maleic anhydride, itaconic acid, crotonic acid, maleic acid, mesoconic acid, citraconic acid, styrene sulfonic acid, allyl sulfonic acid, methallyl sulfonic acid, or vinyl sulfonic acid.

8. The method of claim 1, further comprising triggering the hydrolysis of the hydrolyzable compound.

9. The method of claim 1, wherein the composition comprises a protective shell encapsulating the hydrolyzable compound.

10. The method of claim 1, wherein the method is performed by a system comprising:
a tubular disposed in the subterranean formation; and
a pump configured to pump the composition comprising the hydrolysable compound in the subterranean formation through the tubular.

11. A method of treating a subterranean formation, the method comprising:
placing in the subterranean formation a composition comprising a hydrolyzable compound comprising at least one of an ester and an anhydride;
hydraulically fracturing the subterranean formation with the composition to generate a flow path in the subterranean formation;
at least partially hydrolyzing the hydrolyzable compound to reduce the pH in the subterranean formation;
at least partially breaking a crosslinked gel in the subterranean formation to provide a broken gel;
at least partially removing the broken gel from the subterranean formation; and
wherein the hydrolyzable compound is selected from the group consisting of:

43

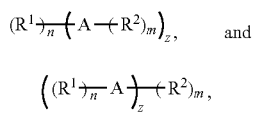

Structure I

Structure II wherein:
at each occurrence $R^1$ is independently selected from the group consisting of:
a monovalent, divalent, or trivalent $R^4$ group, wherein at each occurrence $R^4$ is independently selected from the group consisting of $(C_1-C_{20})$ hydrocarbyl, $(C_0-C_{20})$hydrocarbyl$(C_5-C_{20})$aryl $(C_0-C_{20})$hydrocarbyl, and $(C_0-C_{20})$hydrocarbyl $(C_5-C_{20})$heteroaryl$(C_0-C_{20})$hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from the group consisting of O, S, and substituted or unsubstituted N,
a polymer comprising a repeating unit having a structure selected from the group consisting of:

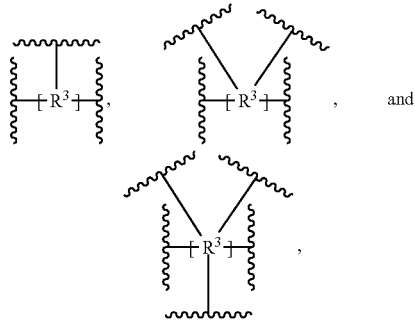

wherein $R^3$ is a trivalent, tetravalent, or pentavalent $R^4$ group,
$R^1$ together with one or two other $R^1$ groups bonded to the same A group or to a different A group is a divalent or trivalent $R^4$ group, and
$R^1$ together with an $R^2$ group bonded to the same A group or to a different A group is a divalent $R^4$ group; and
at each occurrence $R^2$ is independently selected from the group consisting of:
—OH,
—OR$^1$,
$R^2$ together with an $R^1$ group bonded to the same A group or to a different A group is a divalent $R^4$ group, and
$R^2$ together with an $R^1$ group bonded to a different A group is an —O— group;
at each occurrence z is independently 1, 2, or 3; and
at each occurrence A is independently selected from the group consisting of:

44

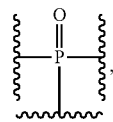

wherein n+m=3, n at each occurrence is independently 0, 1, or 2, and m at each occurrence is independently 1, 2, or 3,

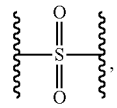

wherein n+m=2, n at each occurrence is independently 0 or 1, and m at each occurrence is independently 1 or 2, and

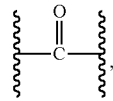

wherein n+m=2, n at each occurrence is independently 0 or 1, and m at each occurrence is independently 1 or 2.

12. A method of treating a subterranean formation, the method comprising:
placing in the subterranean formation a composition comprising a hydrolyzable compound comprising at least one of an ester and an anhydride, the compound selected from the group consisting of:

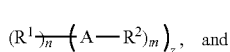

Structure I

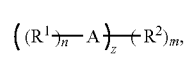

Structure II wherein:
at each occurrence $R^1$ is independently selected from the group consisting of:
a monovalent, divalent, or trivalent $R^4$ group, wherein at each occurrence $R^4$ is independently selected from the group consisting of $(C_1-C_{20})$ hydrocarbyl, $(C_0-C_{20})$hydrocarbyl$(C_5-C_{20})$aryl $(C_0-C_{20})$hydrocarbyl, and $(C_0-C_{20})$hydrocarbyl $(C_5-C_{20})$heteroaryl$(C_0-C_{20})$hydrocarbyl, wherein each hydrocarbyl, aryl, and heteroaryl at each occurrence is independently substituted or unsubstituted, and each hydrocarbyl at each occurrence is independently at least one of interrupted and terminated by 0, 1, 2, or 3 heteroatoms selected from the group consisting of O, S, and substituted or unsubstituted N,
a polymer comprising a repeating unit having a structure selected from the group consisting of:

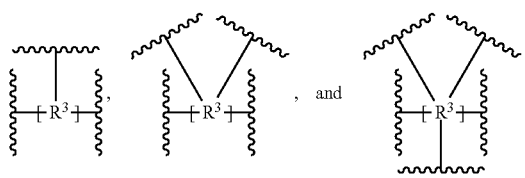

wherein $R^3$ is a trivalent, tetravalent, or pentavalent $R^4$ group, $R^1$ together with one or two other $R^1$ groups bonded to the same A group or to a different A group is a divalent or trivalent $R^4$ group, and $R^1$ together with an $R^2$ group bonded to the same A group or to a different A group is a divalent $R^4$ group; and at each occurrence $R^2$ is independently selected from the group consisting of:

—OH,

—OR$^1$, $R^2$ together with an $R^1$ group bonded to the same A group or to a different A group is a divalent $R^4$ group, and $R^2$ together with an $R^1$ group bonded to a different A group is an —O— group;

at each occurrence z is independently 1, 2, or 3; and at each occurrence A is independently selected from the group consisting of:

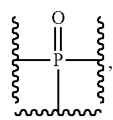

wherein n+m=3, n at each occurrence is independently 0, 1, or 2, and m at each occurrence is independently 1, 2, or 3,

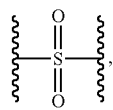

wherein n+m=2, n at each occurrence is independently 0 or 1, and m at each occurrence is independently 1 or 2, and

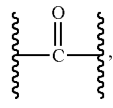

wherein n+m=2, n at each occurrence is independently 0 or 1, and m at each occurrence is independently 1 or 2; and at least partially hydrolyzing the hydrolyzable compound to reduce the pH in the subterranean formation.

13. The method of claim 12, wherein the hydrolyzable compound is selected from the group consisting of:

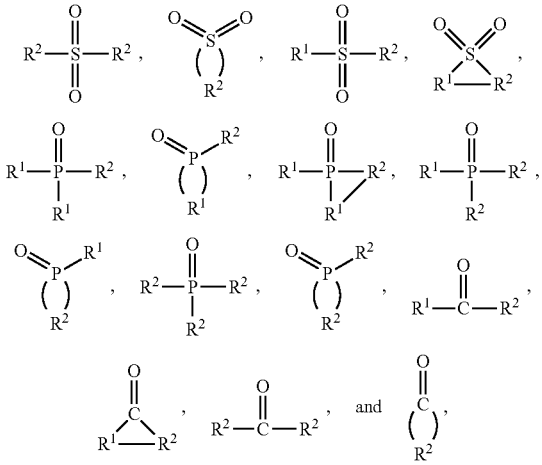

wherein:

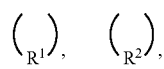

and —$R^1$—$R^2$— are each independently —$R^4$—.

14. The method of claim 12, wherein the hydrolyzable compound is a compound having a structure selected from the group consisting of:

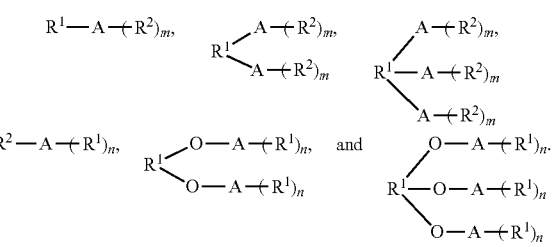

15. The method of claim 12, wherein the hydrolyzable compound is a compound having a structure selected from the group consisting of:

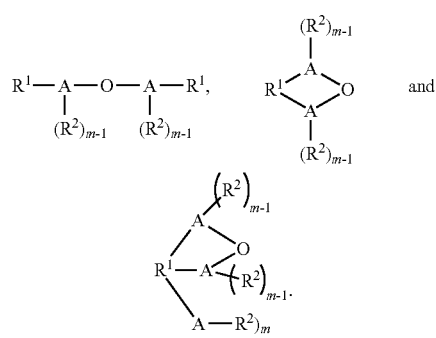

16. The method of claim 12, wherein the hydrolyzable compound is a compound having a structure selected from the group consisting of:

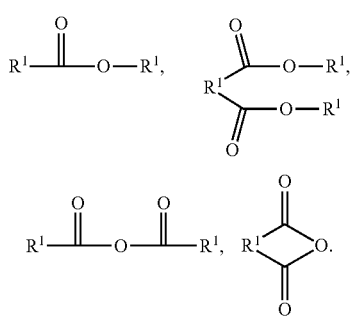

17. The method of claim 12, wherein the hydrolyzable compound is a polymer comprising a repeating unit having a structure selected from the group consisting of:

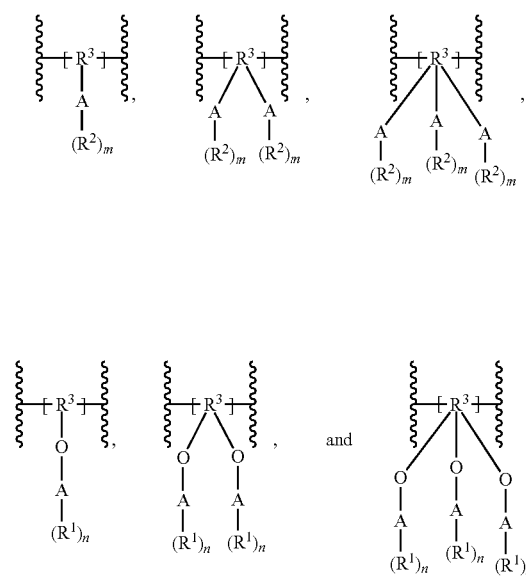

18. The method of claim 12, wherein the hydrolyzable compound is a polymer comprising a repeating unit having a structure selected from the group consisting of:

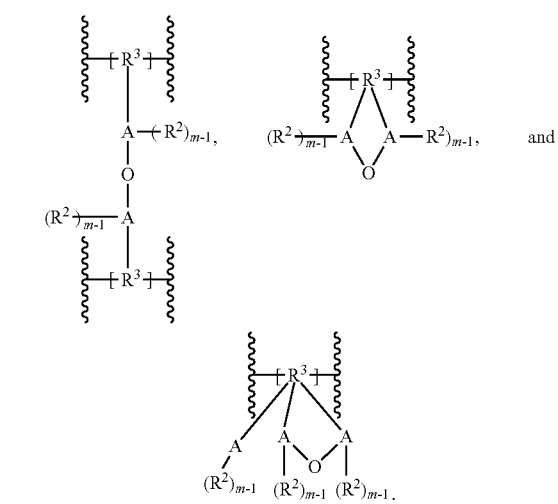

19. The method of claim 12, wherein the hydrolyzable compound is a polymer comprising a repeating unit having a structure selected from the group consisting of:

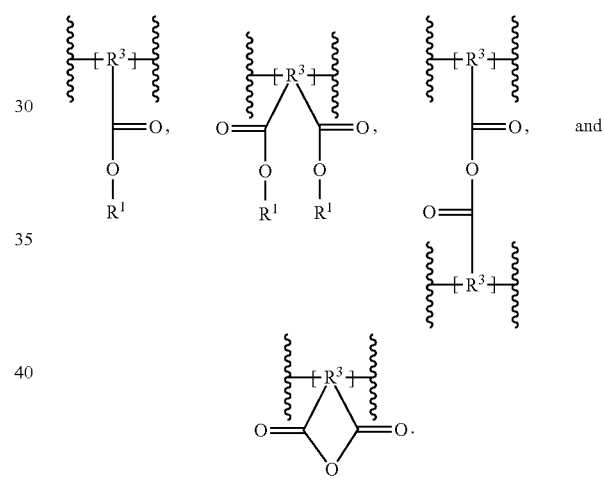

* * * * *